United States Patent [19]

Richter et al.

[11] Patent Number: 5,652,872

[45] Date of Patent: *Jul. 29, 1997

[54] TRANSLATOR HAVING SEGMENT BOUNDS ENCODING FOR STORAGE IN A TLB

[75] Inventors: David E. Richter, Milpitas; James S. Blomgren, San Jose, both of Calif.

[73] Assignee: Exponential Technology, Inc., San Jose, Calif.

[*] Notice: The term of this patent shall not extend beyond the expiration date of Pat. No. 5,440,710.

[21] Appl. No.: 436,137

[22] Filed: May 8, 1995

Related U.S. Application Data

[63] Continuation-in-part of Ser. No. 207,857, Mar. 8, 1994, Pat. No. 5,440,710.

[51] Int. Cl.$^6$ ................................................. G06F 12/10
[52] U.S. Cl. ........................... 395/500; 395/417; 395/800
[58] Field of Search .................................. 395/417, 500, 395/800

[56] References Cited

U.S. PATENT DOCUMENTS

| | | | |
|---|---|---|---|
| 3,942,155 | 3/1976 | Lawlor | 340/172.5 |
| 4,376,297 | 3/1983 | Anderson et al. | 364/200 |
| 4,550,368 | 10/1985 | Bechtolsheim | 364/200 |
| 4,675,646 | 6/1987 | Lauer | 340/146.2 |
| 4,885,680 | 12/1989 | Anthony et al. | 364/200 |
| 4,961,135 | 10/1990 | Uchihori | 364/200 |
| 4,972,338 | 11/1990 | Crawford et al. | 364/200 |
| 5,058,003 | 10/1991 | White | 364/200 |
| 5,239,642 | 8/1993 | Guitierrez et al. | 395/425 |
| 5,249,278 | 9/1993 | Krauskopf | 395/400 |
| 5,261,049 | 11/1993 | Lumelsky et al. | 395/164 |
| 5,371,894 | 12/1994 | DiBrino | 395/800 |
| 5,440,710 | 8/1995 | Richter et al. | 395/417 |
| 5,479,627 | 12/1995 | Khalidi et al. | 395/415 |

OTHER PUBLICATIONS

Computer Architecture, A Quantatitative Approach, Hennessy and Patterson, pp. 15,433–449.

Modern Operating Systems, Tanenbaum, pp. 82–85, 132–141.

A Fast Translation Method for Paging on top of Segmentation, Dally, IEEE Tran. Comp. 1992.

*Primary Examiner*—Kevin J. Teska
*Assistant Examiner*—A. Roberts
*Attorney, Agent, or Firm*—Stuart T. Auvinen

[57] ABSTRACT

A computer system emulates segment bounds checking with a paging system. Pages entirely within a segment are designated as 'clear pages', while the first and last pages containing segment bounds may be partially-valid pages. The computer system has a memory with a segment descriptor table and an active segment descriptor cache. The active segment descriptor cache holds a copy of the segment descriptors for the active segments in a central processing unit (CPU). The active segment descriptor cache also hold the first and last clear page numbers and the first and last linear address offsets for the active segment. A software segment load routine copies portions of the segment descriptor from the segment descriptor table to the active segment descriptor cache when a user program loads a new segment. Only the segment base address is copied to the CPU die; the segment limit and selector need not be stored on the CPU die. The CPU has a translation-lookaside buffer (TLB) that includes bounds fields and a comparator for signaling when an offset portion of a linear address is outside the bound on a page. A TLB miss routine compares the linear address to the first and last clear pages in the active segment descriptor cache and loads a fully-valid page if the linear address is between the first and last clear pages, but loads the bounds field with the page offset of the segment bound if the linear address is to a partial page at the bounds of the segment.

20 Claims, 17 Drawing Sheets

Fig. 1: Prior Art

SEGMENT
DESCRIPTOR
TABLE(S)

MEMORY x8192 xN | BASE ADDR | ATRIB | LIMIT |

SEGMENT
REGISTERS

ACTIVE SEGMENT
DESCRIPTOR CACHE x6 | SEG SELTOR | BASE ADDR | ATRIB | LIMIT |

TRANSLATION-LOOKASIDE BUFFER x32 | LIN ADDR | PHY ADDR | ATRIB |

CPU

PRIOR ART  Fig. 3

TRANSLATOR HAVING SEGMENT BOUNDS ENCODING FOR STORAGE IN A TLB

BACKGROUND OF THE INVENTION— RELATED APPLICATIONS

This application is a continuation in part (CIP) of "Emulation of Segment Bounds Checking Using Paging with Sub-Page Validity", U.S. Pat. No. 5,440,710, U.S. Ser. No. 08/207,857 filed Mar. 8, 1994, assigned to the same Assignee and with at least one common inventor. This application is also related to "Emulation of Program Watchpoint Checking Using Paging With Sub-Page Validity", U.S. Pat. No. 5,598,593, assigned to the same Assignee and with at least one common inventor. This application is further related to "Method for Debug Emulation of Multiple Breakpoints by Page-Partitioning Using a Single Breakpoint Register", U.S. Ser. No. 08/436,136, also assigned to the same Assignee and with at least one common inventor.

BACKGROUND OF THE INVENTION—FIELD OF THE INVENTION

This invention relates to address translation handlers, and more particularly for methods to emulate segment bounds checking with a paging system.

BACKGROUND OF THE INVENTION— DESCRIPTION OF THE RELATED ART

Some computer architectures, such as for RISC or reduced instruction set computers, employ paging without segmentation, since paging can be simple to implement. However CISC (complex instruction set computer) architectures employ both segmentation and paging. One such architecture is the x86 architecture, at present embodied in CPU's such as the 386, 486, and Pentium™ manufactured by Intel Corporation of Santa Clara, Calif., and others.

In a paging system, a page table defines the mapping or translation between a program or virtual address generated by the user's program, and a physical address of a location in memory. Physical memory is divided into many pages, with each page being the same size, typically 4096 or 4K bytes. Each page begins and ends on a "page boundary", which is always a multiple of the page size, 4K bytes.

Definitions

A virtual address is composed of two parts: the lower 12 bits form the address within a page, or page offset, while the upper address bits determine which page is accessed. The upper bits of the virtual address are the virtual page number, and these upper bits are translated and replaced with a physical page number. The virtual page number is translated to a physical page number by either a page table in main memory, or by a cache of the page table such as a translation-lookaside buffer (TLB). The physical address is thus composed of the translated page number and the un-translated offset.

Page tables and TLB's are well-known and are discussed more fully with respect to the x86 architecture in U.S. Pat. No. 4,972,338, issued in 1990 to Crawford and assigned to Intel Corporation of Santa Clara, Calif. A TLB is a small cache of the most recently used translations in the page tables. Inasmuch as the page tables are usually stored in main memory, accessing the page table for each memory reference adds significant overhead to each reference and slows the system down. Since each page table translation or entry covers 4K memory bytes, relatively few page table entries need to be cached by the TLB for a high hit rate and improved performance for most programs. The term "virtual address" is often used rather loosely to refer to any address except the physical address. The physical address is output from the paging unit and is the actual address in memory of a datum. When both segmentation and paging are combined, a user program generates an "effective address", which is then translated by the segmentation unit to a "linear address". The linear address is then translated by the paging unit or a TLB to the "physical address". Sometimes the effective address and the linear address are referred to as virtual addresses.

PRIOR-ART SEGMENTATION AND PAGING HARDWARE—FIG. 1

FIG. 1 is a block diagram of address generation in a typical x86 processor, which includes both segmentation and paging. Address generate unit 30 calculates a virtual or effective address 32 from address components indicated by an instruction being processed. Address generate unit 30 or other decode logic (not shown) indicates which segment is being referenced by the instruction and selects one segment descriptor 34 in a segment descriptor register array 33. The selected segment descriptor 34 includes a base address field which outputs the base or starting address of the selected segment on line 36, and a limit or upper bound which is outputted on line 40. Effective address 32 is added to the base address 36 in segment adder 42, to produce a linear address 38. The segment adder 42 must be a full 32-bit adder in the x86 architecture because segments can begin and end on any boundary, down to single-byte granularity.

Subtractor 44 subtracts the effective address 32 from the limit 40. If a negative value results, then the effective address exceeds the limit and a segment overrun error is signaled. A second adder/subtractor could be used to check the lower bound of the segment; however if the lower bound is always effective address 0, then the segment adder 42 can be used for the lower bound check. If the result is a negative number then the lower bound has been violated. Thus the negative flag or the sign bit may be used for lower bound checking. Comparators may also be employed for bounds checking.

Linear address 38 is translated to a physical address by translation-lookaside buffer or TLB 46, which is a small cache of the page translation tables stored in main memory. TLB 46 translates the upper 20 bits of the linear address by searching the associative TLB cache for a match, and if one is found, then replacing these upper 20 bits with another 20 bits stored in the TLB 46.

If the linear address is not found in the TLB, then a miss is signaled to the translator 48, which accesses the page tables in main memory and loads into the TLB the page table entry that corresponds to the linear address. Future references to the same page will "hit" in the TLB, which will provide the translation. Translator 48 may be implemented entirely in hardware, entirely in software, or in a combination of hardware and software.

PRIOR-ART SEGMENT TABLES & REGISTERS—FIG. 2

FIG. 2 illustrates the communication between a CPU and memory for supporting segmentation. ALU 30, or an address generate unit, indicate which segment is being accessed when an effective address is sent to segment adder 42. The segment number selects a descriptor entry in segment descriptor register array 33. The segment's base address is then sent to segment adder 42 and added to the effective address. The resulting linear address is outputted to TLB 46, which translates the linear address to physical address 50. Physical address 50 is used to access memory 12.

CPU 10 is limited in the number of segment descriptors that may be stored in segment descriptor register array 33. Typically only six segments may be cached in array 33 on the die of CPU 10. Segment descriptor table 14 in memory 12 stores descriptors for many other segments. Other segment descriptor tables may also be provided in memory 12. While the segment number is sufficient to identify one of the six segments stored in array 33 on CPU 10, other segments are identified by a segment selector. A segment selector includes an index into Segment descriptor table 14 to locate one particular descriptor. In the x86 architecture, a global bit in the segment selector determines if a local or a global segment descriptor table is used, allowing two segment descriptor tables to be "accessible" at any given time.

PRIOR-ART SEGMENT DESCRIPTORS AND CACHE—FIG. 3

FIG. 3 highlights the relationship between data structures on the CPU die and in memory for segmentation. In memory, each segment descriptor contains a segment base address, a segment limit, which together define the bounds of a segment, and attributes. Each segment descriptor table may hold up to 8K entries, and there may be several descriptor tables.

On the CPU die, a cache of six active segments is kept. The segment selector is stored in a segment register while the descriptor is retrieved from memory and cached in an active segment descriptor cache. Each TLB entry contains a linear address field that is compared to a linear address output from the segmentation unit. The TLB outputs a physical address and paging attributes from a matching TLB entry.

Objects of the Invention

What is desired is to emulate segment bounds checking with a paging system. It is desired to emulate CISC-style segmentation with a simple RISC-type paging system. Emulation routines are desired to emulate instructions that load a new segment. Emulation routines are also desired to properly handle a page miss when the page lies within a segment.

SUMMARY OF THE INVENTION

A system for emulating segmentation on a processor with page-address translation has a central processing unit (CPU). The CPU has a segment register for storing a base address of an active segment. The active segment is accessed by a user program executing on the CPU. The segment register does not store a limit for the active segment. In some aspects of the invention the segment register is a general-purpose register (GPR).

A linear address generation means receives an identifier for the active segment from the user program, and selects the segment register containing the active segment and adds the base address of the active segment to an address from the user program. The linear address generation means outputs a sum as a linear address. A translation-lookaside buffer (TLB) receives the linear address from the linear address generation means. The TLB has a plurality of page translation entries for pages in memory having a fixed number of offset addresses, with each page translation entry having a linear address field and a physical address field. The TLB outputs the physical address field for a matching entry when a portion of the linear address matches the linear address field in the matching entry.

A memory has a plurality of storage locations addressable by a plurality of physical addresses. A first portion of the memory stores a segment descriptor table comprising a plurality of segment descriptors, each having attributes, a base address, and a limit for a segment. A second portion of the memory stores an active segment descriptor cache which has a plurality of entries for active segments loaded in the CPU for access. The identifier for the active segment selects a selected cache entry for the active segment. Each entry has a copy from the segment descriptor table of the attributes of one of the active segments. Each entry also has a first clear page field indicating the address of a first clear page in the active segment. The first clear page has all offset addresses within the page being valid for access. A first linear address field in each entry indicates a first linear address for the active segment. The segment's limit is not stored on the CPU but is only stored in the memory.

In further aspects an emulation handler means is executed on the CPU. It checks for segment bounds violations of linear addresses for pages not having all offset addresses within the page valid. Thus segment bounds are checked only for pages not having all offset addresses within the page valid, while clear pages with all offset addresses valid are not checked for segment bounds violations.

A bound field in the matching entry in the TLB contains a bound for the active segment. A segment bounds checking means receives the bound from the matching entry of the TLB, and compares a portion of the linear address to the bound. Signaling a segment bound violation if the linear address is outside the bound for the active segment. The segment bounds checking means is disabled when the matching entry contains a clear page with all offsets within the page valid for access by the active segment. Thus segment bounds are checked only for pages not having all offset addresses within the page valid, while clear pages with all offset addresses valid are not checked for segment bounds violations.

In still further aspects of the invention each entry in the active segment descriptor cache also has a last clear page field indicating the address of a last clear page in the active segment. The last clear page has all offset addresses within the page valid for access. A last linear address field indicates a last linear address for the active segment.

Other aspects of the invention include methods for emulating a segment load by a CPU. A portion of the segment table entry is copied to an active segment descriptor cache in the memory. A base address from the segment table entry is copied to a segment register on the CPU. A first clear page (FCP) number identifying a first clear page for an active segment is generated. The first clear page is a first page in the active segment with all offset addresses within the page valid for access by the active segment.

Other aspects of the invention include a method for loading a translation-lookaside buffer (TLB) on a central processing unit (CPU). A first clear page number and a last clear page number are read from an entry in the active segment descriptor cache. A page number portion of a linear address is compared to the last clear page number. The TLB is loaded with a clear page translation entry under appropriate conditions.

BRIEF DESCRIPTION OF THE DRAWINGS

FIG. 3 highlights the relationship between data structures on the CPU die and in memory for segmentation.

DETAILED DESCRIPTION

The present invention relates to an improvement in address generation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

This is a continuation-in-part of (CIP) of "Emulation of Segment Bounds Checking using Paging with Sub-Page Validity", U.S. Pat. No. 5,440,710 U.S. Ser. No. 08/207,857 filed Mar. 8, 1994, hereby incorporated by reference. Additional background information on segmentation and paging is provided in the parent patent.

Several embodiments of a RISC-type paging system adapted for emulation of segment bounds checking are presented in the parent, U.S. Pat. No. 5,440,710. The basics of a software emulation routine was presented. However, more efficient procedures to implement the emulation of segmentation are desired. Novel emulation routines and data structures have been invented for use with a CPU having a RISC-type paging system.

CONCEPT OF CLEAR PAGES—FIGS. 4–5

The parent patent first disclosed that segment bounds need only be checked for pages that contain a segment boundary. For large segments, only the first page and the last page need to be checked for segment boundary violations; pages entirely within the large segment do not need to be checked at all for segment bounds violations. Pages entirely within a large segment are called "clear" pages.

Figure 1:
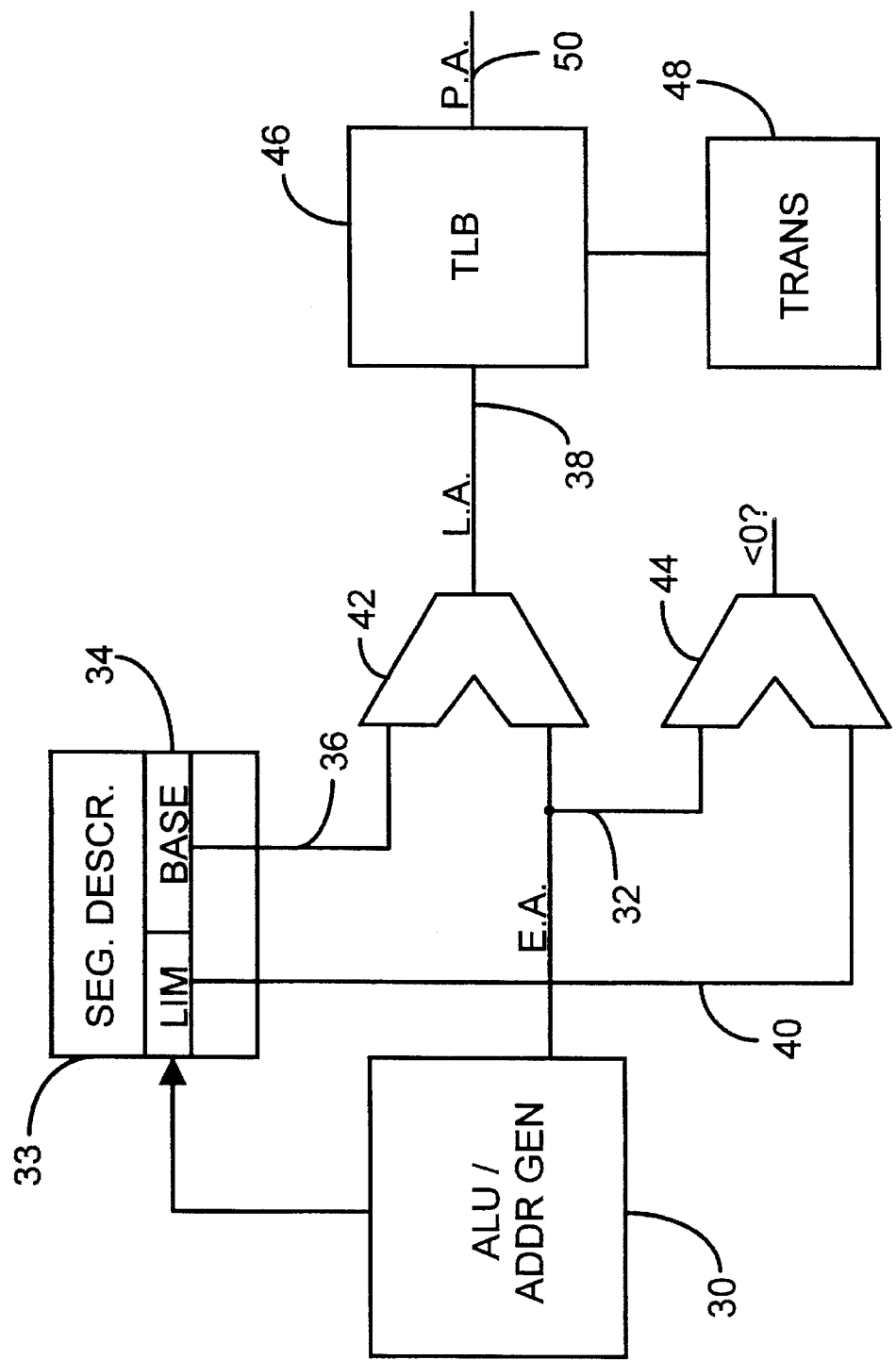
FIG. 1 is a block diagram of address generation in a typical x86 processor, which includes both segmentation and paging.
Figure 2:
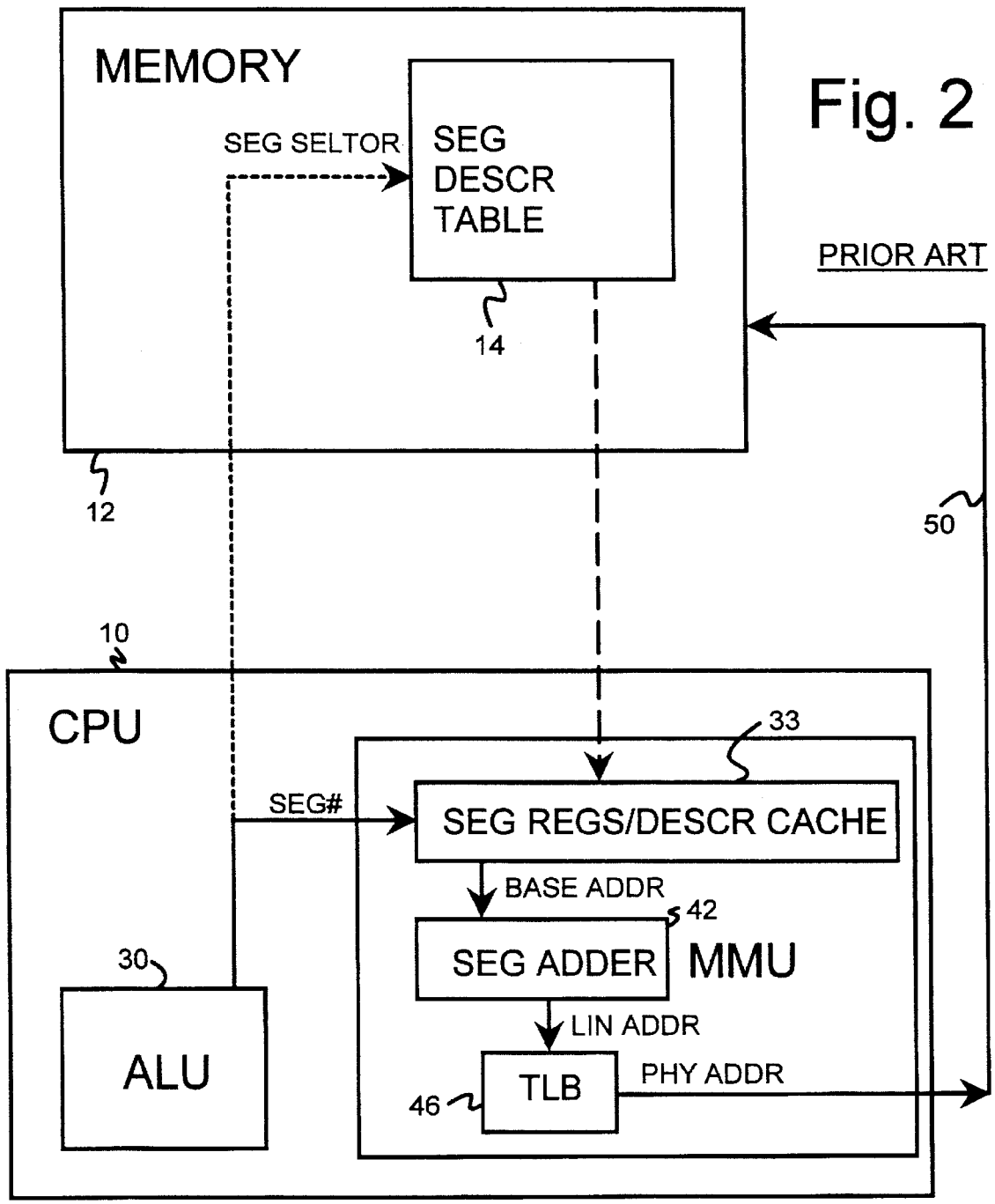
FIG. 2 illustrates the communication between a CPU and memory for supporting segmentation.
Figure 4:
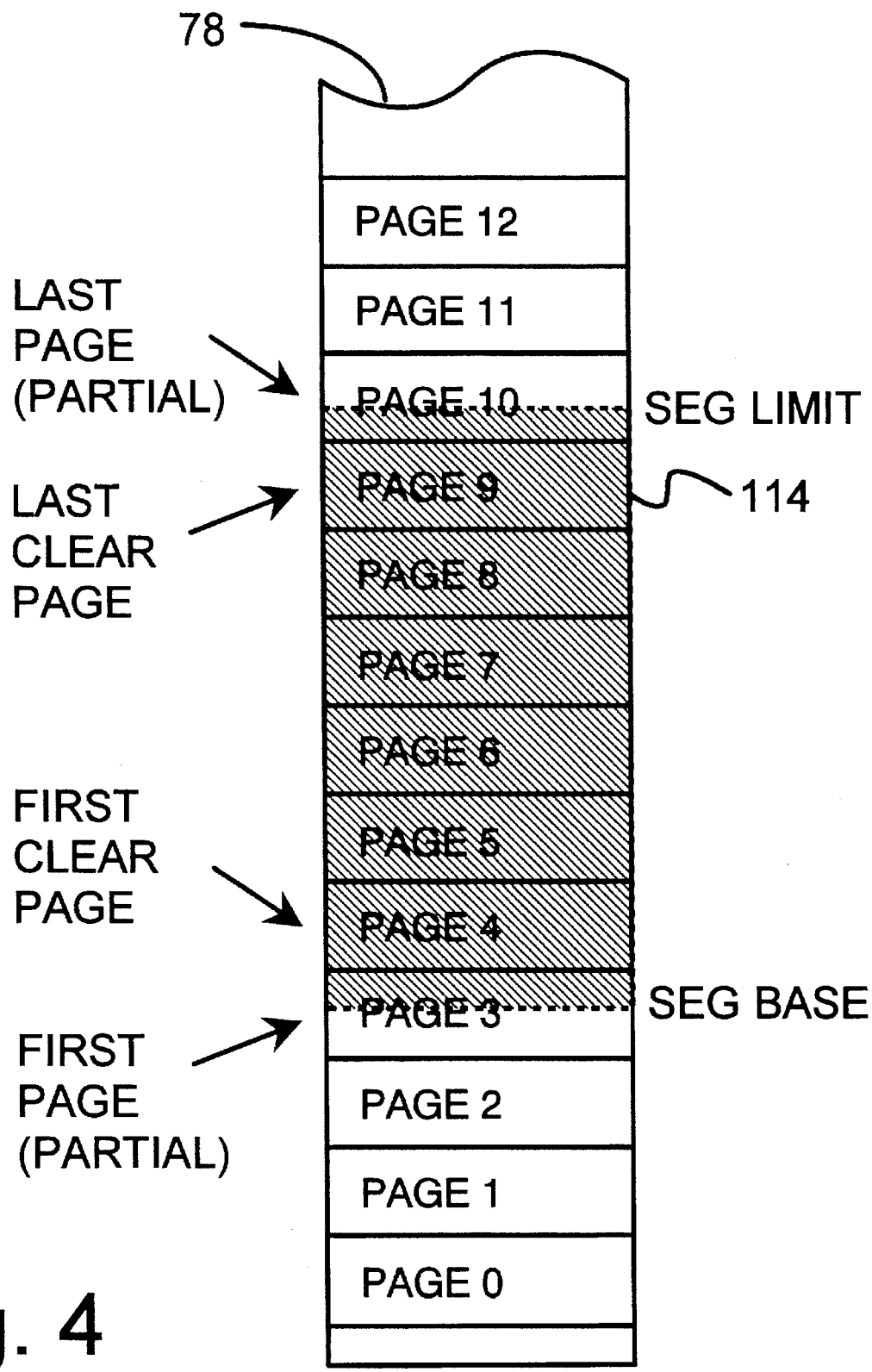
FIG. 4 shows a large segment in physical memory space.

FIG. 4 shows a large segment 114 in physical memory space 78. Segment 114 begins at the segment base on page 3, and ends at the segment limit on page 10. Thus only pages 3 and 10 need to be checked for segment bounds violations.

Pages 3 and 10 are partially-valid pages for segment 114. Pages 4, 5, 6, 7, 8, and 9 lie entirely within segment 114 and are thus clear pages. Page 4 is the first clear page (FCP) of segment 114, while page 9 is the last clear page (LCP) for segment 114. When segment boundaries are not aligned to page boundaries, the first clear page is always one page above the first partial page, while the last clear page is always one page less than the last partial page for the segment. However, a small segment (not shown) may not have any clear pages.

First and Last Linear Addresses (FLA, LLA)

Figure 5:
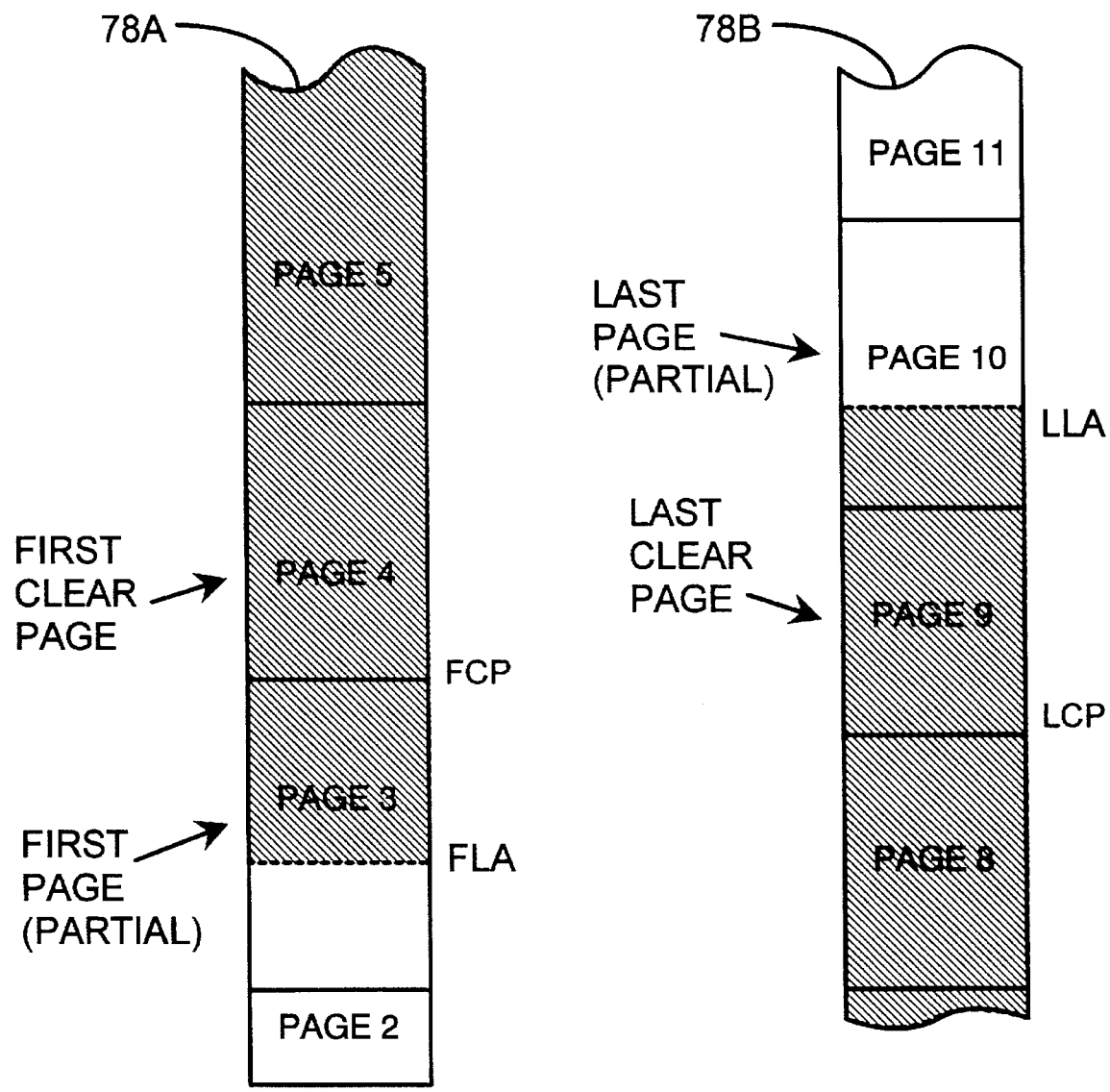
FIG. 5 is an enlarged view of the segment boundaries.

FIG. 5 is an enlarged view of the segment boundaries. Memory space 78A is the lower portion of physical memory space 78, while memory space 78B is the upper portion of memory space 78. Page 4 is the first clear page (FCP), and is identified by the starting address of page 4, FCP. The first address of the segment, its base address, is indicated by the first linear address (FLA) on page 3.

Page 9 is the last clear page (LCP), and is identified by the starting address of page 9, LCP. The last address of the segment, at its upper bound, is indicated by the last linear address (LLA) on page 10, the last partial page. Since the limit is the number of bytes in the segment, the upper bound's address is the sum of the base address and the limit (base+limit). Thus the last linear address (LLA) is base+limit in the x86 architecture.

The concepts of clear pages, and first and last clear pages and linear addresses, are useful in constructing emulation routines and segment memory structures. By using these concepts in emulation routines, the amount of information cached on the CPU die from the segment descriptor may be greatly reduced.

ACTIVE SEGMENT DESCRIPTOR CACHE IN MEMORY—FIG. 6

Figure 6:
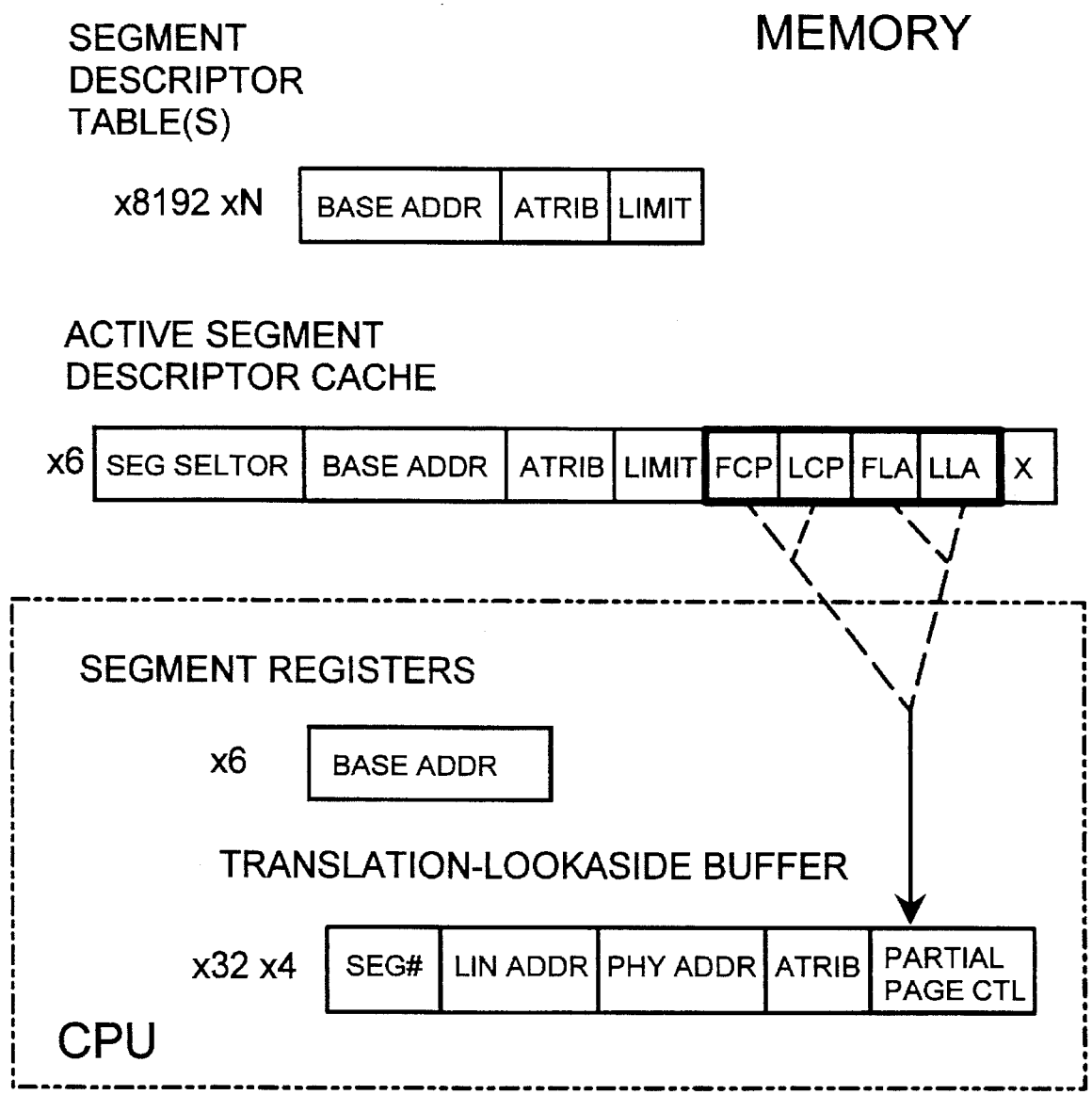
FIG. 6 highlights data structures in memory and on the CPU die for emulation of segmentation.

FIG. 6 highlights data structures in memory and on the CPU die for emulation of segmentation. Segment descriptor tables are kept in memory, as in the prior art. However, rather than cache on the CPU die the full descriptors for six active segments, these active descriptors are cached in memory. Since memory is much less expensive than registers on the CPU die, it is much more cost effective to cache these descriptors in abundant memory than in the crowded CPU die.

The segment's base address must still be stored on the CPU die, since this base must be added to every address generated by the user program. The segment selector, segment limit, and attributes are not stored on the CPU die, as they are not needed. Instead, the segment's attributes are merged in with the page attributes in a TLB entry, so that the most restrictive of the segment and page attributes is stored in the TLB. For example, if the segment is read-write, but the page is read-only, then the more restrictive attribute, read-only, is loaded into the TLB for that page. Likewise, if the privilege level is 3 for the segment but only 2 for the page, the segment's more-restrictive privilege level of 3 is loaded into the TLB's page entry.

The TLB entries also contain a new segment number field. This segment number field can contain the three-bit segment number that indicates which of the six active segments the TLB entry corresponds to. In a preferred embodiment, this segment number field contains six binary bits, with each bit indicating if that TLB entry is valid for an active segment. Thus a single TLB entry may be used by all six active segments. A single TLB entry may be shared by two or more active segments by setting two or more of the six segment enable bits in the TLB's segment number field.

The TLB entry also contains a new partial page control field. This field holds the bounds information for partial pages, as will be explained for FIG. 9. This bounds information is conveniently generated when necessary from the first and last linear address and clear page information: FLA, LLA, FCP, LCP. The dashed lines of FIG. 6 indicate that the partial page control field is generated from the FCP, LCP, FLA, LLA fields in the active segment descriptor cache in memory.

Memory Cache Stores FCP, LCP, FLA, LLA

The active segment descriptor cache in memory conveniently stores additional information used to load the TLB with segment information. Storing this information with the segment descriptor improves the speed of the segmentation emulation routine as the necessary information is stored in one place.

FIG. 6 shows that the active segment descriptor cache stores the first and last clear page and linear address information in fields FCP, LCP, FLA, LLA. These fields are calculated each time a segment is loaded by a program running on the CPU and the loaded segment becomes one of the six active segments. The clear page information does not need to be stored for each of the possibly thousands of segments in the segment tables, which would increase the memory required to store these segment tables.

Other information useful to the emulation handlers is also stored with the active segment descriptor entries. This information may include a pointer to a linked list of entries in the TLB enabled for a particular segment. This linked list is useful when a new segment is loaded and the old segment must be flushed from the TLB. The emulation handler can simply invalidate the TLB entries in the list for the old segment, rather than search all entries in the TLB for entries enabled for the old segment being purged. This extra field is labeled as field "x" in FIG. 6. A routine using field x and the linked list is described later in reference to FIG. 13.

The segment selector is also stored in the active segment descriptor cache rather than on the CPU die. This selector is used by the emulation routines to locate a particular descriptor in the segment descriptor tables in memory. The selector contains an index into a segment table, and a bit to indicate if a local or global descriptor table is to be used. Thus the segment selector, like the segment limit, is removed from the CPU die and placed in inexpensive memory.

The selector is usually generated by a user program or operating system and loaded into a segment register on the CPU die. The selector may first be loaded into a general-purpose register (GPR), or it may reside in memory. The emulation routine is activated by a segment load instruction. The emulation routine moves the new selector to the segment register which will erase the old base address stored there. The emulation routine then purges the old segment from the TLB and active segment descriptor cache. After the old segment has been purged, the emulation routine moves the new selector from the GPR register or memory to the active segment descriptor cache. This new segment selector is then also used to locate the segment's entry in the segment tables, and the new segment's base and limit and attributes are fetched from the segment table and loaded into the active segment descriptor cache.

The segment selector is generated by the user program or operating system and loaded into a segment register on the CPU die. The emulation routine moves this segment selector to the active segment descriptor cache, and uses the selector to find the segment's entry in the segment tables, and copies the base, limit, and attributes to the active segment descriptor cache. Thus the information in the active segment descriptor cache originates from both the CPU die and the segment table.

FIG. 6 shows that only the segment base must be stored on the CPU die as a special register for segmentation. On a RISC processor, certain general-purpose registers may be designated by the system software or emulation routines for storage of the six segment base addresses. Thus most of the segmentation registers have been removed from the CPU. The extension of the TLB with the segment number field and partial page control fields is more streamlined than adding segmentation logic, as existing paging hardware is extended rather than new subsystems being added.

Figure 7:
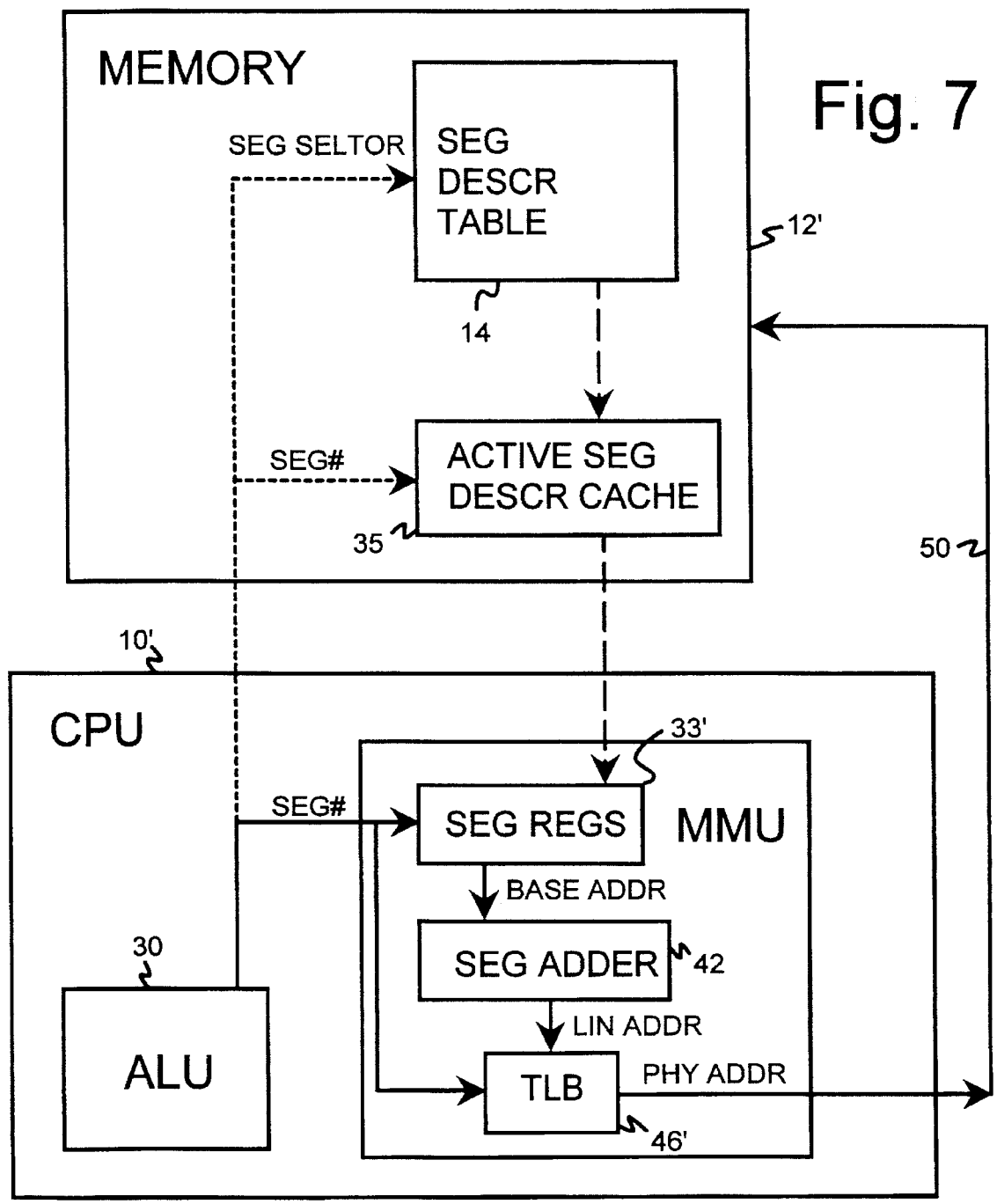
FIG. 7 is another diagram of the location of segment information in the system.

Segment Selector and Limit Not Stored on CPU—FIG. 7

FIG. 7 is another diagram of the location of segment information in the system. The system includes memory 12' and CPU die 10'. The CPU die 10' includes an arithmetic-logic-unit (ALU) 30 which includes address generation logic. ALU 30 sends a program's effective address to segment adder 42, which adds this effective address to the segment's base address. The base address is stored in segment registers 33', and one of six base addresses is selected by the identifier or segment number received from the ALU. The linear address produced by the segment adder searches TLB 46' for a matching entry, and the physical address is output if a matching entry is found.

As was described in reference to FIG. 6, segment registers 33' contains the base address, but not the selector or limit. Active segment descriptor cache 35 contains the segment selector and limit, as well as another copy of the base address. Active segment descriptor cache 35 is called a "cache" although it is in normal main memory, which is typically constructed from dynamic RAM. It is a cache in the sense that it holds a subset of the information in segment descriptor table 14. Since only six segments can be active on CPU 10' at any time, only six entries are needed in active segment descriptor cache 35. Only the 3-bit segment number identifier is needed to access an entry in cache 35, along with the starting address of this table, which is either explicitly stored in memory 12' or is part of the instruction code executed by the emulation routines. However, the much larger size of segment descriptor tables 14 requires that the 16-bit segment selector be used to point to a particular segment's entry, rather than just the 3-bit segment number. Thus access of the segment descriptor tables 14 is more complex and slower, as the proper address is more difficult to generate.

RISC PAGING HARDWARE EMULATES SEGMENTATION—FIG. 8

Figure 8:
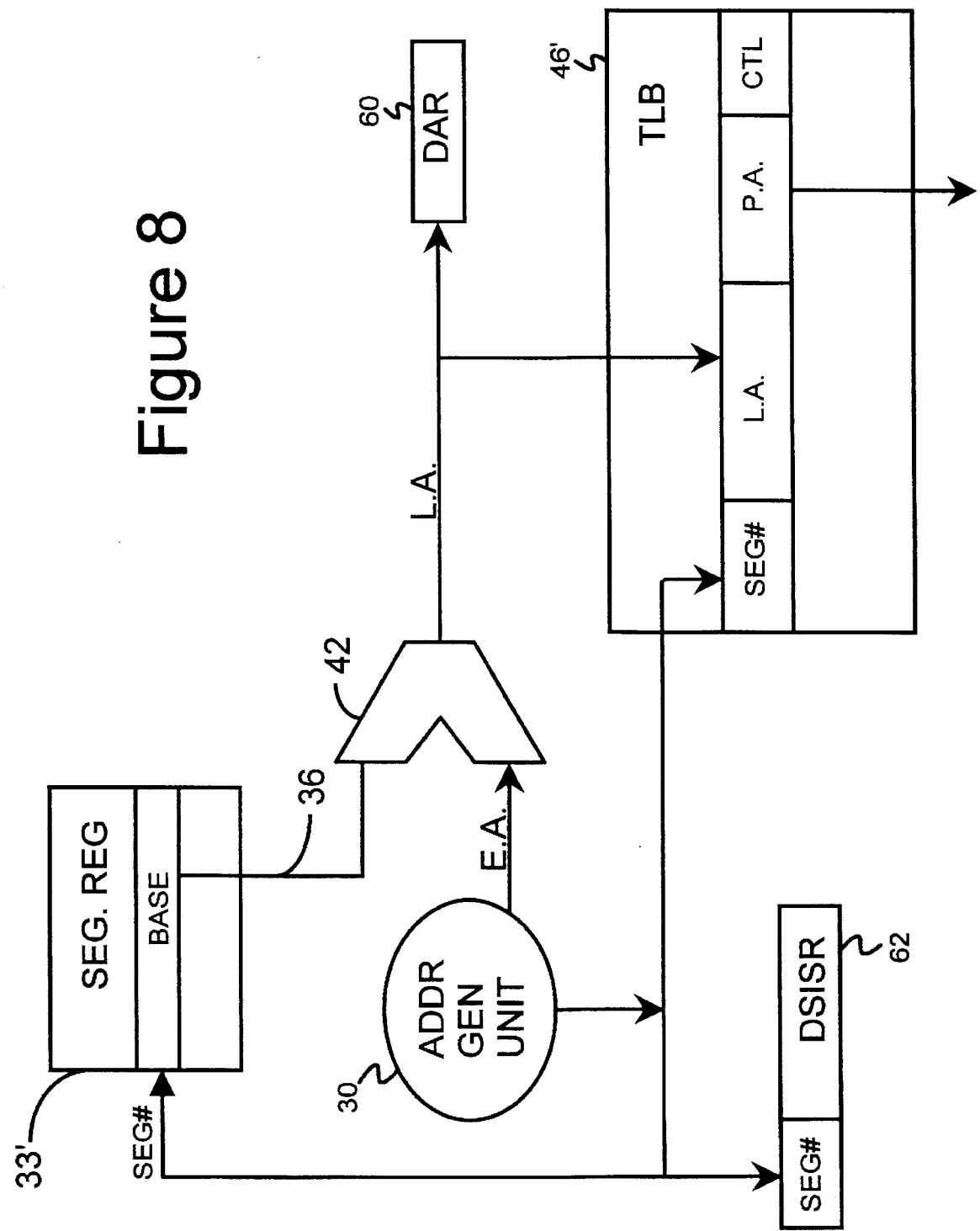
FIG. 8 is a simplified diagram of the address generation hardware on the RISC CPU.

FIG. 8 is a simplified diagram of the address generation hardware on the RISC CPU. An ALU or address generate unit 30 generates an effective address (E.A.) from execution of a user's program. ALU 30 also determines which segment should be accessed. For example, when a data move instruction is executed, an effective address for the data item in memory is generated by ALU 30. This effective address is typically in the data segment (DS:), so the segment number outputted corresponds to the data segment. If the instruction executed is a jump instruction, the effective address generated is the address of a target instruction. In that case, the effective address is in the code segment (CS:), and the segment number outputted corresponds to the code segment. An example of one possible mapping of active segments to segment numbers is shown below in Table 1.

TABLE 1

| Active Segments | | |
|---|---|---|
| Segment Name | Code | Segment # |
| Code Segment | CS: | 000 |
| Data Segment | DS: | 001 |
| Stack Segment | SS: | 010 |
| Extra Data Segment | ES: | 011 |
| Extra Data Segment | FS: | 100 |
| Extra Data Segment | GS: | 101 |

The segment number selects one of the six base addresses stored in the segment registers 33'. The selected base address is outputted on bus 36 to segment adder 42, which sums the base and the effective addresses. The resulting linear address (L.A.) searches through TLB 46' for an entry that matches the upper 20 bits of this linear address. If a matching entry is found, the segment number stored in that matching entry must also match the segment number output from the ALU 30. If the segment numbers and linear addresses match, then the physical address is read out of TLB 46' and combined with the low 12 offset bits of the linear address (not shown) and output to memory as the physical address.

The linear address is also loaded into data address register 60 (DAR). DAR register 60 holds all linear addresses, whether for data, instructions or for the stack. The segment number is loaded into a portion of data storage interrupt service register 62 (DSISR). DAR register 60 and DSISR register 62 are used by the PowerPC™ architecture for exception handling. When no matching entry is found in TLB 46', a page fault is signaled and the execution of the user program suspends while the matching page entry is fetched from page tables in memory. On some CPU's, the page fault is handled by a hardware sequencer or state machine. In the preferred embodiment, this page fault handler is a software routine that reads DAR register 60 to get the linear address, which is used to locate the matching entry in the page tables, and DSISR register 62, which is used to indicate the status. Status can indicate if the linear address corresponds to an instruction address or a data address. Storing the segment number in this status register is convenient if the page fault handler must consult the active segment descriptor cache. The opcode and any instruction modifier bytes such as register specifiers or prefixes may also be stored in DSISR register 62.

TLB 46' also contains partial page control fields, which indicate if the page is a clear page, with no bounds checking required, or a partially-valid page that must be checked.

TLB FIELDS FOR BOUNDS AND OFFSET COMPARE LOGIC—FIG. 9

Figure 9:
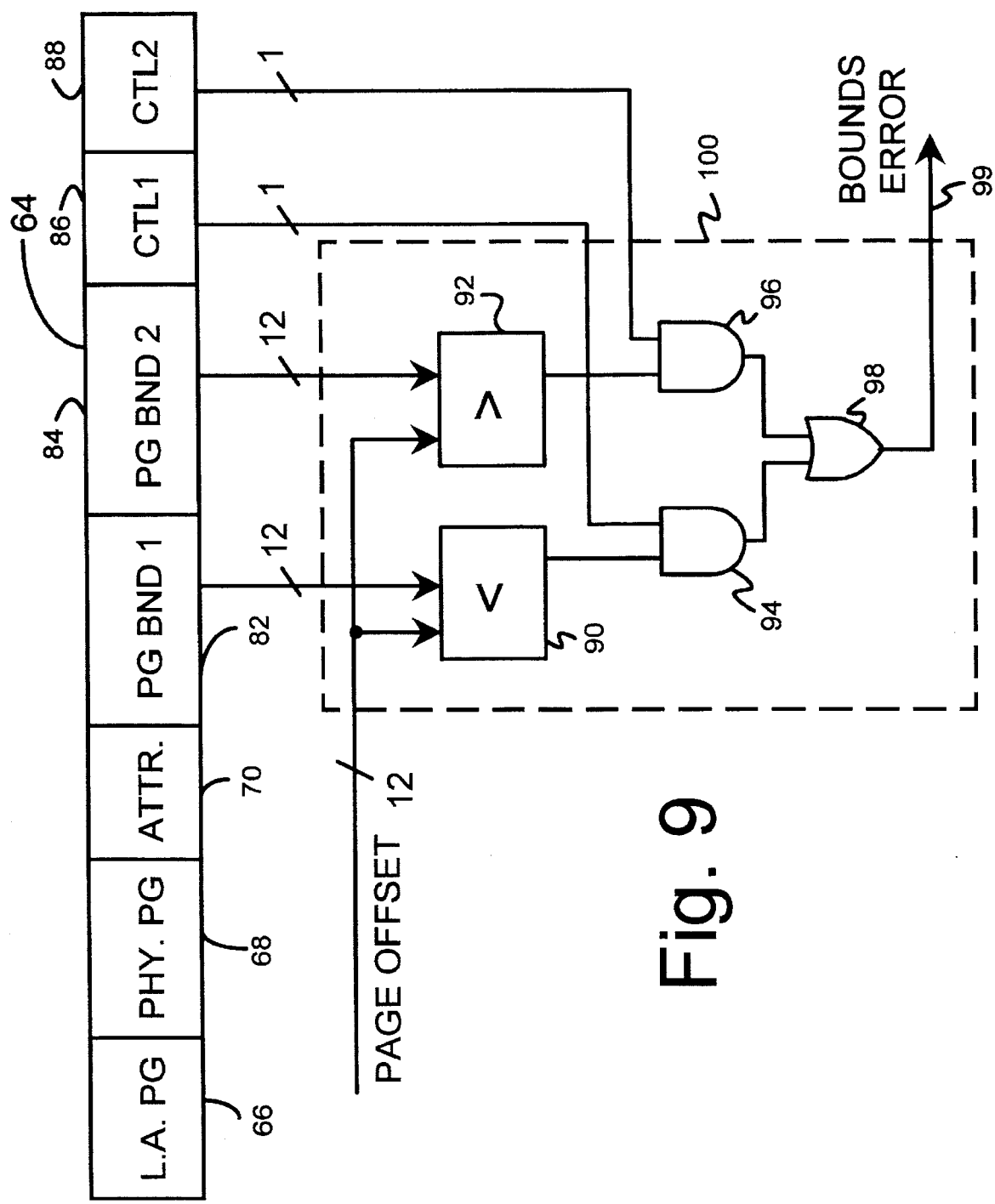
FIG. 9 shows in detail a preferred embodiment for a TLB entry.

FIG. 9 shows in detail an embodiment for a TLB entry 64. The upper 20 bits of the 32-bit linear and physical addresses are stored in fields 66,68. Attributes are stored in attributes field 70. Two page offset bounds fields 82, 84 are provided that contain the 12-bit page offset of the boundary of the valid portion of the page, for partially-valid pages. Two control fields 86, 88 enable page offset bounds fields 82, 84, respectively. Each control field 86, 88 is one bit. When the control bit is high, comparison of the corresponding offset bounds field to the offset of the current linear address is enabled.

Two page offset bounds fields are provided in this embodiment for efficient encoding of pages with two events, which occur for small segments that lie entirely within a single page, program watchpoints, and faulty memory locations. These are typically small blocks within a page. Thus by having two page offset bounds fields, the starting and ending addresses for the small block may be specified.

The page offset bounds fields 82, 84 contain enough bits to specify the page offset down to the desired granularity. Thus for a 4 K-byte page, which has 12 bits of address offset, 32-bit aligned word granularity requires that 10 bits be stored in each page offset bounds field 82, 84, while full byte-granularity requires that a full 12-bit offset address be stored in each page offset bounds field 82, 84.

Sub-page logic 100 includes comparison logic 90 which outputs a one to AND gate 94 when the 12-bit offset portion of the current linear address is less than the 12-bit offset bound stored in field 82. If the first control bit stored in control field 86 is also enabled (high), then an error will be signaled on bounds error line 99 from OR gate 98. Thus the first comparison signals an error when the linear address is below the first offset bounds.

The opposite type of comparison is performed for the second offset bounds field. Comparison logic 92 outputs a one to AND gate 96 when the 12-bit offset portion of the current linear address is greater than the 12-bit offset bound stored in field 84. If the second control bit stored in control field 88 is also enabled (high), then an error will be signaled on bounds error line 99 from OR gate 98. The second comparison thus signals an error when the linear address is above the second bounds.

Table 2 shows the encoding of control bits 86, 88 and how the 12-bit offset of the linear address is compared to the offset bounds fields. In Table 2, "y" refers to the value stored in first offset bounds field 82, while "z" refers to the value stored in second offset bounds field 84. Proper programming of these offset bounds fields and their control bits allows for segment base checking at the lower bound of the segment, or segment limit checking at the upper bound of the segment. Comparison for both fields may be enabled to allow for checking of very small segments that lie entirely within a single page.

TABLE 2

| Encoding of Partial Page Control Bits | | |
|---|---|---|
| Control Bits 86, 88 | Error if | Use |
| 00 | Never | Clear Page, No Checking |
| 01 | >z | Segment Upper Bound |
| 10 | <y | Segment Lower Bound |
| 11 | >z OR <y | Segment Within a Page |

Several types of events may be supported with two offset bounds and the encoding of Table 2. With the control bits 86, 88 set to "00", the entire page is valid. An encoding of "10" specifies that all address greater than the second offset bound 84 is valid, as when a segment begins within a page. The "01" encoding may be used for the end of a segment, when the upper bound ends within a page. Thus the first offset bound 82 specifies the upper limit of validity within the page. Encoding "11" specifies validity between the two offset bounds 82, 84, which may be used to specify a segment that lies entirely within a single page.

HARDWARE EQUIVALENT OF FCP, LCP, FLA, LLA GENERATION—FIG. 10

Figure 10:
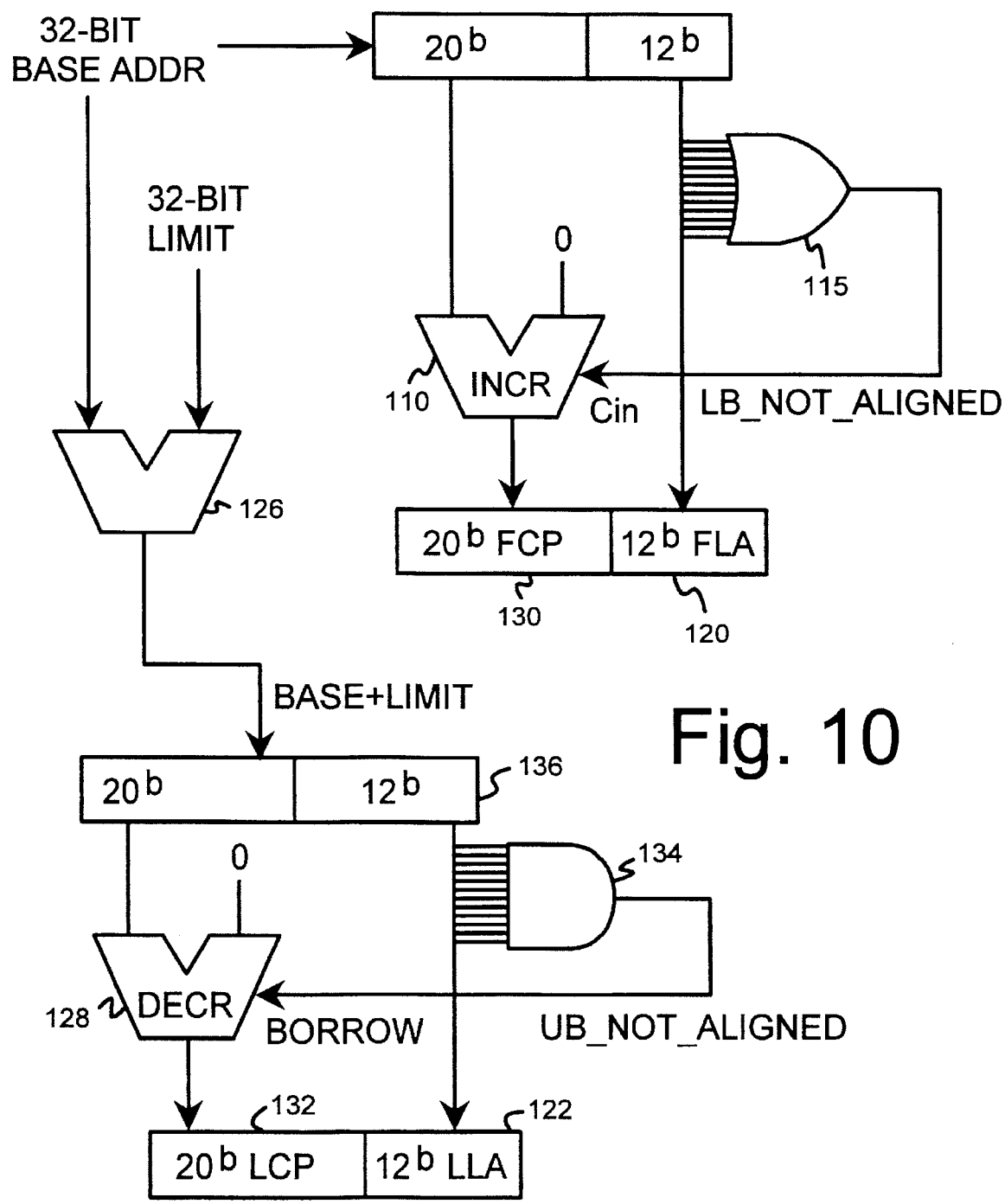
FIG. 10 is a hardware embodiment for generating the first and last clear page and linear address fields.

FIG. 10 is a hardware embodiment for generating the first and last clear page and linear address fields. The 32-bit base address is broken into a 20-bit upper portion or page number and a 12-bit lower portion of offset. OR gate 115 outputs a low signal when all 12 lower bits of the base's offset are zero. All of the base's offset bits are zero when the base is the first address of a page, when the segment's base is aligned with the start of a page. If any of the 12 offset bits are one, then the segment is not aligned to the page, and the page number must be incremented. The first clear page is the next page after the first partial page, so the 20-bit page number of the base address must be incremented. Incrementer 110 increments the 20-bit page number of the base address when its carry-in input is high, which occurs when OR gate 115 signals that any of the 12 offset bits are non-zero.

Incrementer 110 is only 20 bits in size, and its output is stored as the page number for the first clear page 130 (FCP). The 12 offset bits of the base address are stored as the 12 offset bits of the first linear address 120 (FLA). While both the FCP and FLA could be stored as full 32-bit addresses, preferably only a subset of these 32-bit addresses are stored, as shown in FIG. 10. Since the address for the first clear page 130 will always be page-aligned, the 12 offset bits for FCP will always be zero. Thus they do not need to be stored. Storage space may be reduced by saving only the 20-bit page number for the first clear page 130. The address of the first linear address (FLA) 120 actually includes a 20-bit page number as well as a 12-bit offset. The 20-bit page number for the FLA will be one page lower than the first clear page in all instances except when page-aligned. Since the 20-bit page number is always either one less than the FCP, or equal to the FCP, a separate 20-bit page number need not be stored for both the FCP and the FLA. Thus a single 32-bit storage can hold both the FCP and the FLA. The FCP is generated by taking the 20 upper bits and appending 12 zeros for the offset bits, while the FLA is generated by using the low 12 offset bits stored, and appending the upper 20 bits of the FCP when all 12 offset bits are zero, or appending the upper 20 bits of the FCP decremented by one when all 12 offset bits are not all zero.

The upper bound of the segment is the limit. However, the limit is expressed as the maximum effective address of the segment, where the segment base is at effective address zero. Thus the upper bound expressed as a linear address is the base added to the limit, base+limit. Adder 126 adds the 32-bit base to the 32-bit limit and stores the upper linear address in storage 136. AND gate 134 receives all 12 offset bits of the upper bound stored in storage 136, and outputs a one or high signal if all offset bits are one. When all offset bits are one, the offset in hexadecimal is FFFh. Offset FFFh is the last address on a page. Thus the upper bound is page aligned when all 12 offset bits are one. AND gate 134 outputs a decrement signal to decrementer 128 when the upper bound is not page-aligned, which causes decrementer 128 to subtract one from the 20-bit page number of the upper bound is storage 136. The decrementer's result is stored as the page number of the last clear page 132 (LCP). The 12 offset bits of the upper bound from storage 136 are stored as the last linear address 122 (LLA).

Again, the last clear page and last linear address are actually two 32-bit addresses, but only one 32-bit value is stored. When the 12 lower bits stored as LLA 122 are all one, then the 20 upper bits stored as LCP 132 are simply appended to LLA to get a 32-bit value for LLA. When any of the 12 offset bits are zero, the upper bound is not page-aligned, and the 20 bits stored as LCP must be incremented by one before being appended to the 12 offset LLA bits. The full 32-bit LCP value is always the 20-bit LCP 132 stored with 12 zero bits appended as the offset.

Thus storing the clear page addresses as 20-bit page numbers, and the first and last linear addresses as 12-bit offsets reduces storage requirements by half without the loss of address information. The active segment descriptor cache in memory preferably stores the FCP, LCP, FLA, LLA values as 20 and 12-bit values as described here for FIG. 10.

SEGMENT LOAD EMULATION ROUTINE—FIG. 11

In a preferred embodiment, the calculation of FCP, LCP, FLA, LLA values is performed by software when the segment is loaded. When a user program "loads" a new segment, a segment selector is generated by the program or operating system, and moved or loaded into a segment register. In a CISC CPU, this load would invoke a hardware sequence that would fetch the segment table entry from memory and cache the descriptor on the CPU die, and perform a series of attribute and privilege checks. The RISC CPU of the present invention would not directly support this move instruction that transfers the selector to the segment register. Instead, when the opcode is decoded for the segment load instruction, an invalid or undecodable opcode is detected. This calls a software emulation routine, which decoded the opcode and emulates or performs the function that would be performed by the CISC hardware.

Figure 11A:
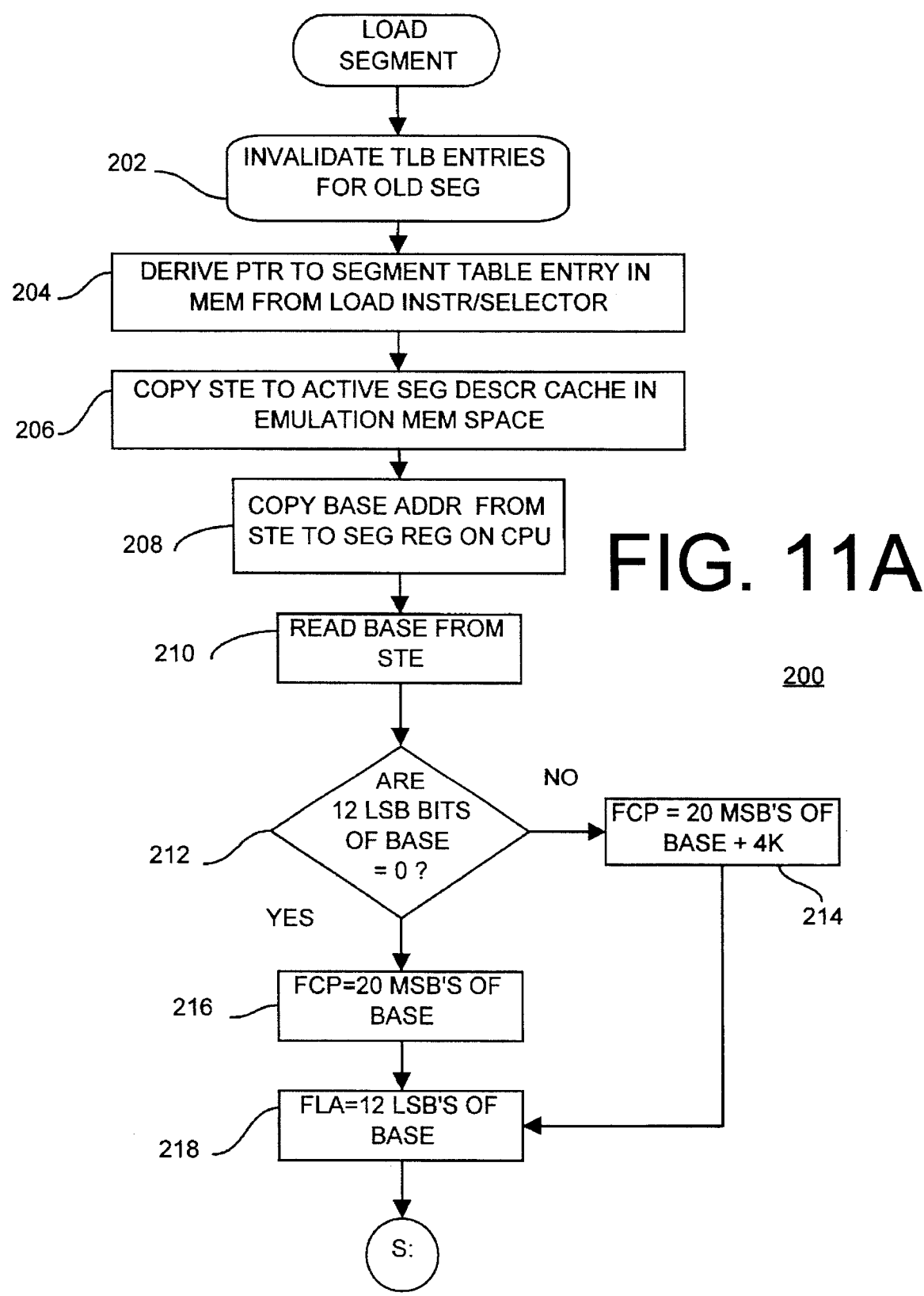
FIGS. 11A and 11B show the steps in a routine that emulates segment loading.
Figure 11B:
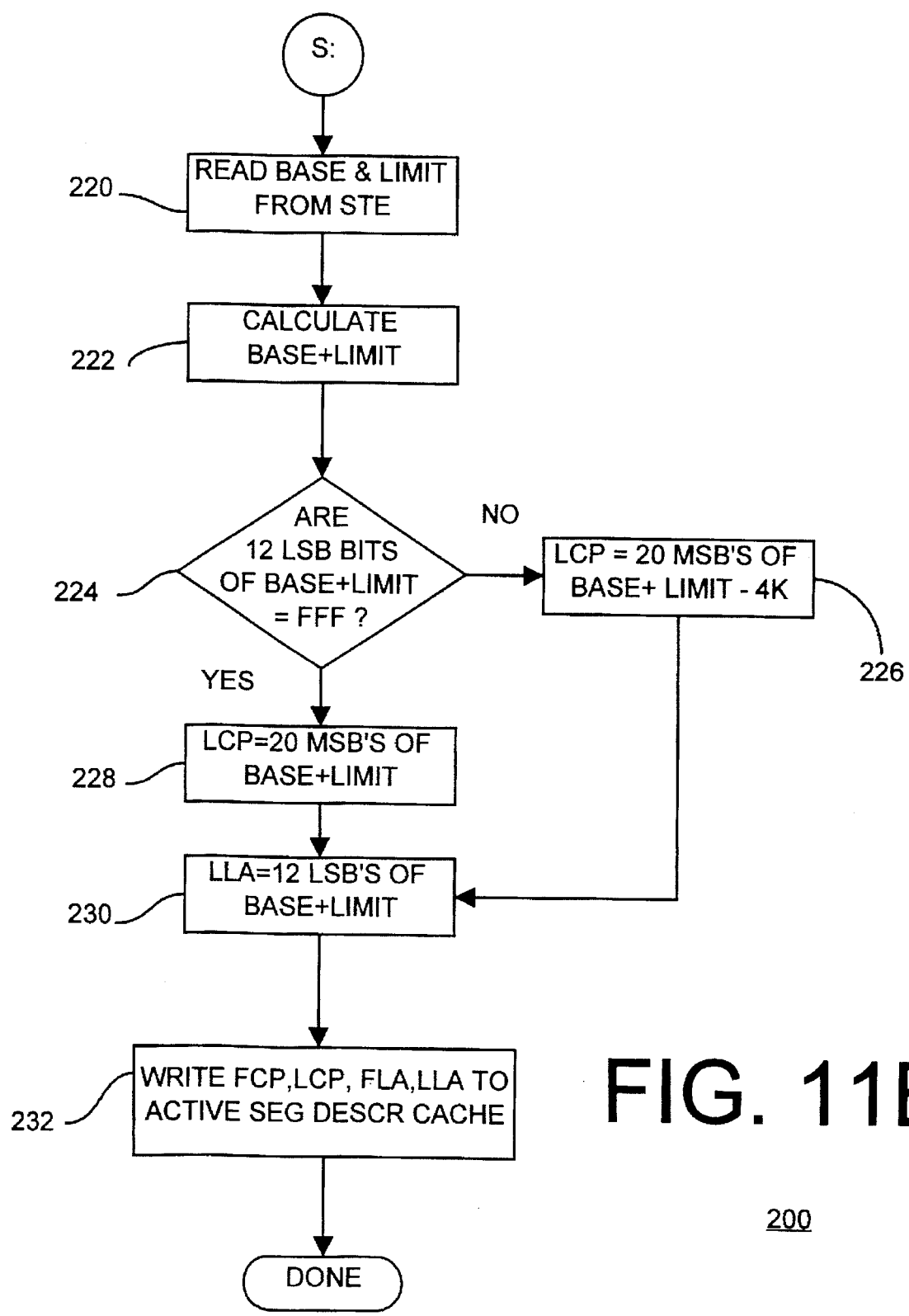

FIGS. 11A and 11B show the steps in a routine that emulates segment loading. When a user program or operating system executes an instruction to load a new value into one of the six segment registers, the instruction decoder is unable to decode that segment load instruction since the CPU's hardware does not directly support segmentation. The instruction decoder signals an invalid opcode, which interrupts the user program or operating system. Emulation code is entered and the opcode is decoded by the software emulation routine, possibly with a partial or pre-decode by the instruction decoder that selects one entry point into the emulation code out of several possible entry points. The entry point is an address of the first instruction to execute in the emulation routine.

The first step 202 in the segment load emulation routine is to invalidate any entries in the TLB for the old segment. One approach would be to flush the entire TLB by invalidating all entries in the TLB. This could have a severe performance penalty. A search could be performed by reading every TLB entry and comparing the segment number field in each TLB entry to the segment number for the segment being loaded. If the segment numbers match, then the TLB entry is invalidated. If the segment number field of the TLB is the preferred embodiment having six bits, one for each segment, then the particular bit for the segment being replaced is checked and cleared if active. Other bits for other segments would not be changed. If all segment bits are off, then the entry could be removed from the TLB entirely by invalidating the entry. A preferred embodiment of the TLB invalidate step 202 using linked lists is shown later in FIG. 13.

Once all TLB entries for the old segment have been invalidated, the new segment is fetched in steps 204, 206. The segment selector is retrieved, from a general-purpose register on the CPU, from a memory location, or from immediate data that is specified by the segment load instruction. The segment selector contains an index into a segment table, and a global/local bit to determine if a local or global segment descriptor table is to be accessed. Other information identifying the user and the starting location in memory of these segment tables is normally stored by the operating system on the CPU die for a CISC CPU, but is stored in memory by emulation code in the present invention. A pointer or address of the particular segment's entry in the segment tables in memory is derived (204) from the selector and the other information stored by emulation code. The segment entry stored at the pointer's location in memory is retrieved (206) and copied to the active segment descriptor cache in the emulation code's portion of the memory.

The information copied to the active segment descriptor cache includes the segment base address, limit, and attributes that are stored in the segment table. The selector is also copied into the active segment descriptor cache from the emulation routine that extracted the selector from a register, memory, or the segment load instruction.

Only the base address from the segment descriptor in memory is copied to the CPU die and loaded into one of the general-purpose registers (GPR's) which holds the segment base (step 208). Any of the unused GPR's may be used for holding the segment base; thus no specific segment register is needed, although for clarity one of these GPR's is shown in the figures as the "segment register" holding the segment base. The segment limit is left in memory in the active segment descriptor cache.

The emulation routine reads the base address, step 210 and determines if the lower 12 bits of the base are all zero (step 212). The segment base is page-aligned if all 12 lower bits are zero. When page-aligned, the FCP field in the active segment descriptor cache is loaded with the 20-bit page number, which is the 20 most-significant bits (MSB's) of the base address (step 216). When the segment base is not page-aligned, the 20 MSB's of the base address are incremented by one and the loaded as the FCP, step 214. This is equivalent to adding 4096 to the page's address, or incrementing the page number by one to yield the first clear page.

The 12 least-significant bits (LSB's), or offset, of the segment base are stored in the active segment descriptor cache as the first linear address (FLA) for the segment being loaded (step 218). Thus 32 bits of memory are used to store both the FCP and the FLA. Of course, 64 bits of memory could be used if the FLA and FCP were each stored as full 32-bit values. This may save some processing time.

FIG. 11B is a continuation of FIG. 11A. In step 220, the base and limit are read, either from the segment table or preferably from the active segment descriptor cache. The base is added to the limit by the emulation routine by coping the base and limit to temporary general-purpose registers (GPR's) on the CPU and using an ADD instruction, with the result being saved to a GPR register or to emulation memory (step 222). If the 12 offset bits of the base+limit result from step 222 are all ones (FFF hex), then the upper bound is page-aligned and the LCP field of the active segment descriptor cache is simply loaded with the upper 20 bits of the base+limit result that was temporarily stored in step 222. If any of the LSB's are zero, then the upper bound is not page-aligned (step 224) and the LCP field is loaded with the upper 20 bits of the base+limit result decremented by one, step 226. Decrementing the LCP by one is equivalent to subtracting one page-length (4K) from the upper bound's page number, yielding the last clear page.

The last linear address (LLA) field is loaded with the 12 lower bits of the base+limit result, step 230. If these FCP, LCP, FLA, LLA values were merely stored in temporary storage such as in GPR's, then they must now be copied to the active segment descriptor cache in memory, step 232. If the FCP, LCP, FLA, LLA values were stored directly to the active segment descriptor cache as they were generated then step 232 is not necessary.

TLB MISS EMULATION ROUTINE—FIG. 12

Another emulation routine is needed for handling page faults. Page faults occur when a linear address is presented to the TLB, but the TLB does not contain any matching entries. For the present invention, a page fault can also occur when a TLB entry is found with a matching linear address, but the segment number field in the TLB does not match the segment number for the linear address, or the segment's enable bit is not active for that matching TLB entry. This can occur when a user program attempts to access another user's segment with the proper linear address, but has not been granted privilege to access that segment. Thus segment faults can initially be signaled as page faults. Another common cause for a page miss is a first write to a page present in the TLB. This first write makes the page "dirty", and a dirty or accessed bit is set in the page tables. The more generic term "TLB miss" is thus used to describe page faults caused either by lack of matching linear address, first write to a page, or segment faults caused by lack of a matching segment number.

Figure 12:
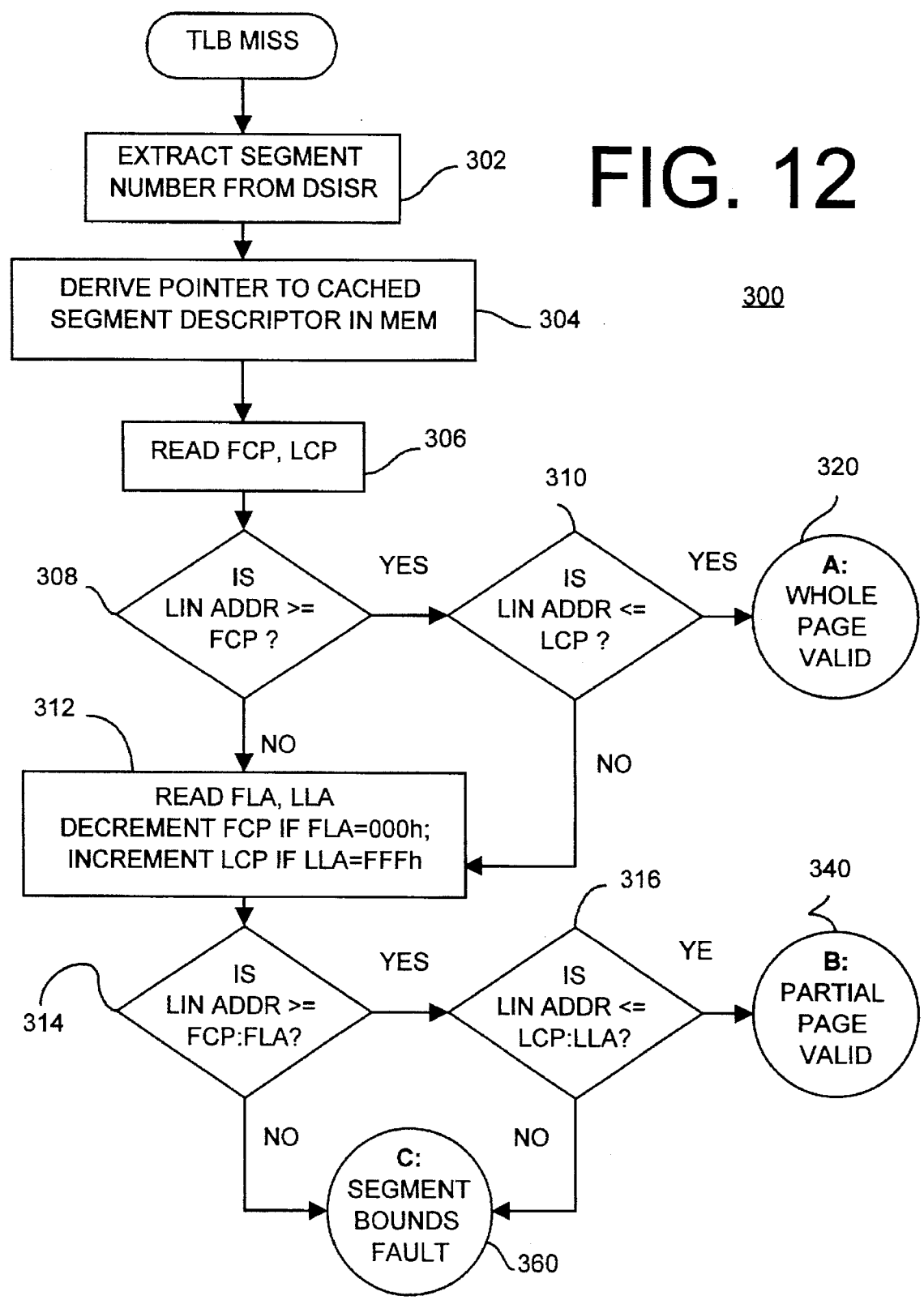
FIGS. 12, 12A, 12B detail the steps in a TLB miss emulation routine.
Figure 12A:
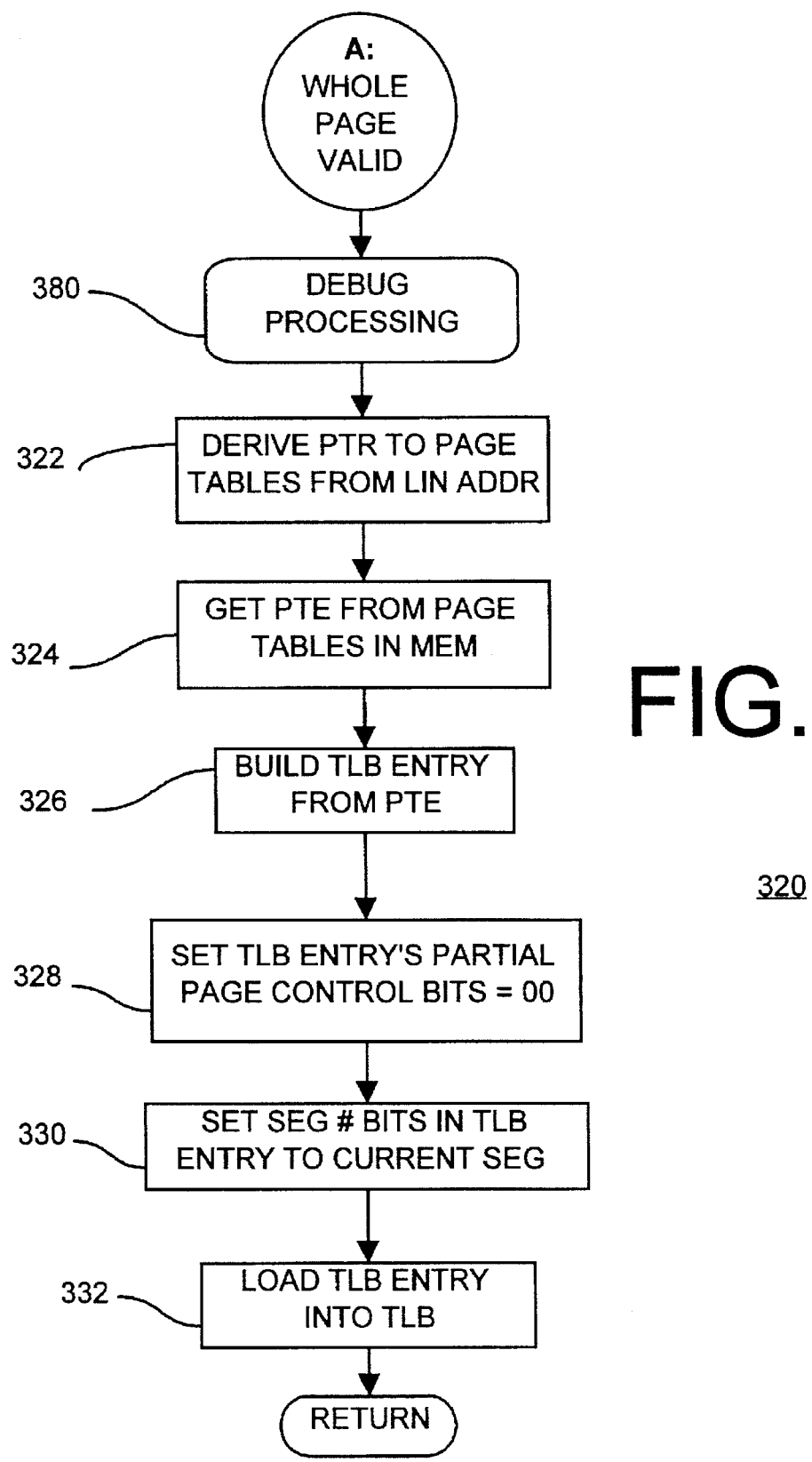
Figure 12B:
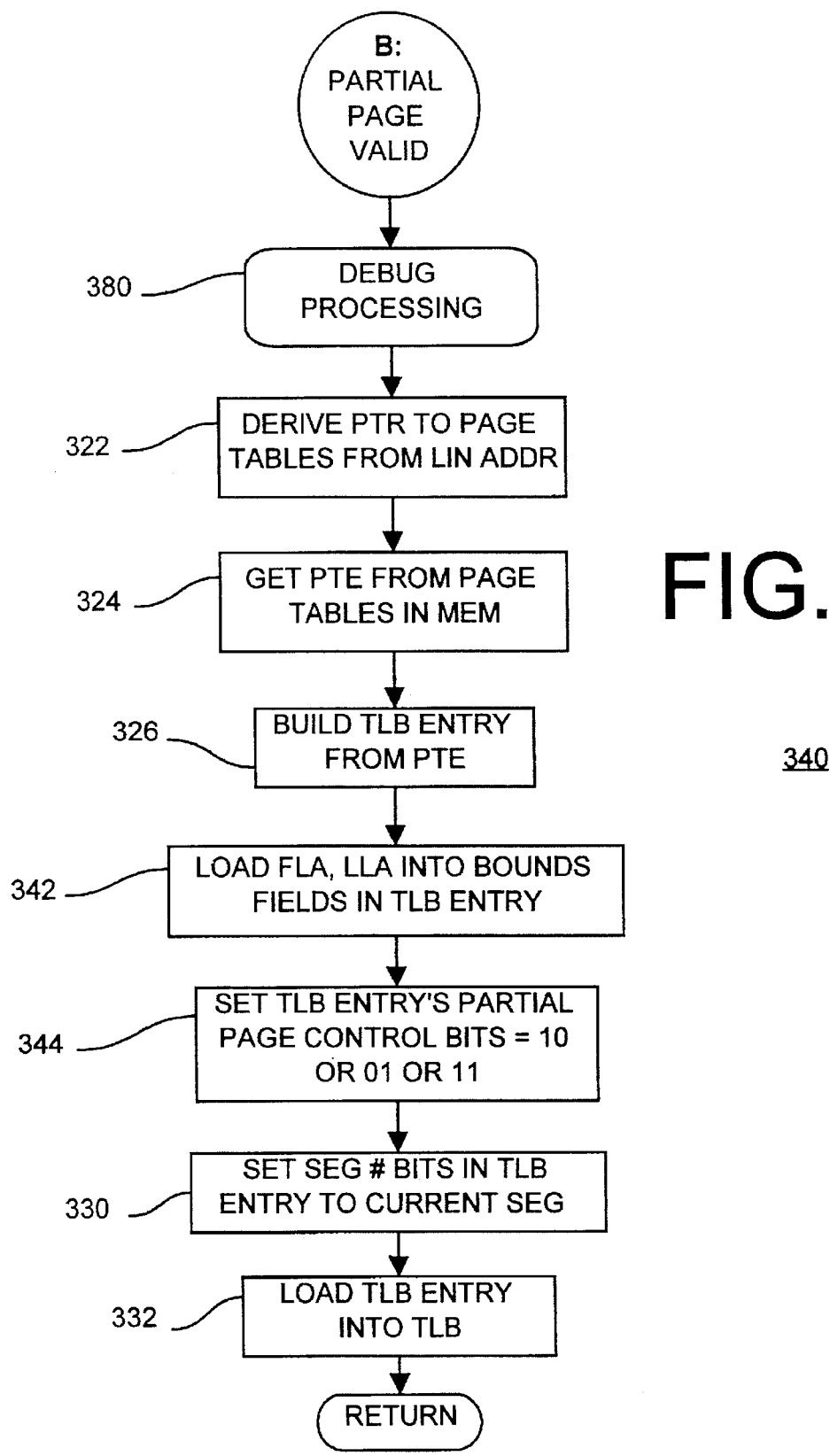

FIGS. 12, 12A and 12B detail the steps in a TLB miss emulation routine. This routine is activated when the TLB hardware is unable to complete address translation, as discussed above. The user program or operating system is interrupted and a starting address for the TLB miss emulation routine is loaded into the CPU's instruction fetcher.

When the TLB generates an interrupt or exception for a page fault, TLB miss routine 300 is started. The segment number is stored for each faulting linear address in DSISR register 62 as discussed for FIG. 8. Likewise each faulting linear address is stored in DAR register 60. When the page fault is signaled, DAR register 60 and DSISR register 62 will be loaded with the values for the faulting linear address and segment. The segment number is extracted from the DSISR register by the emulation routine 300 which reads at least a portion of DSISR register 62, step 302. A pointer to one of the six entries in the active segment descriptor cache is generated, step 304. The emulation routine 300 may simply store a memory pointer to the first entry in the active segment descriptor table, and add the segment number multiplied by the size of each entry.

The active segment descriptor cache is read, and the FCP and LCP values are read (step 306) for the segment indicated by the segment number in the DSISR register 62. If the linear address is greater than the first clear page (FCP), and less than or equal to the last clear page (LCP), then the linear address lies in a clear page and the whole page is valid. Whole page valid subroutine 320 is then activated, FIG. 12A.

If either of the FCP and LCP tests 308, 310 fail, then the linear address lies in a partial page at the ends of the segment or a bounds fault may have occurred. An additional level of bounds checking is then performed by the emulation routine 300. The pointer from step 304 is again used to read the active segment descriptor cache to obtain FLA and LLA. Although all fields—FCP, LCP, FLA, LLA—could have been read at once in step 306, this would require at least a 64-bit data transfer, which might require additional bus cycles. Thus only 32 bits are read in step 306 and additional read step 312 is needed to read FLA, LLA.

The second level of checking compares the linear address to FLA and LLA, steps 314, 316. If the linear address from DAR register 60 is less than the first linear address (FLA), then the linear address is below the lower bound of the segment and a segment bounds fault is signaled, 360. Likewise, if the linear address is greater than the last linear address LLA, the linear address is above the upper bound and the segment bounds fault signaled. Otherwise, if checks 314, 316 pass, then the linear address is within the segment bounds and no segment fault is signaled. Instead, partial-page subroutine 340 of FIG. 12B is activated to complete loading of the TLB.

The first and second levels of checking do not have to perform full 32-bit compares. For the first level, steps 308, 310, the FCP and LCP values are compared. Since these values are stored as 20-bit page numbers, the upper 20 bits of the linear address may simply be compared. Alternatively, 12 zeros may be appended to the FCP value before comparison. For LCP, 12 ones are appended to the 20-bit LCP value before 32-bit comparison. The second level comparison, 314, 316, may be just a 12-bit comparison of the 12-bit FLA, LLA values stored in the active segment descriptor cache, if the 20-bit compare result is saved. If a full 32-bit comparison is used, then the 20-bit page numbers FCP, LCP, must be selectively decremented or incremented, respectively, if the bound's linear addresses are not page-aligned (step 312).

If a segment bounds fault is signaled, 360, then an additional emulation routine is entered (not shown). Segment bounds faults are serious and typically the user program must be halted and control returned to the operating system. Clean-up routines are then executed which are well known.

Whole Page Valid—FIG. 12A

When the whole page is valid, as determined by the first level of checking for clear pages, subroutine 320 of FIG. 12A is executed. Debug or breakpoint processing 380 is first executed, which checks a debug enable register to determine if any breakpoints are active, and performs special processing if necessary. Once debug processing is complete, a pointer to the page tables in memory is derived from the linear address, step 322. The upper 20-bit page number of the linear address from DAR register 60 are used together with a starting address for a page table to locate the proper page entry. Thus the page number acts as an index into a page table. The starting address of the page table is stored in emulation memory or an unused GPR for the present invention, although for CISC machines it was stored as a special register on the CPU. Several levels of page tables may be used, with the first level of page tables being a directory of page tables and the second level being the user's local page table. While appearing to be complex, multi-level page tables are well-known in the art.

The page table entry from the final level of page tables is retrieved from memory, step 324. This page table entry (PTE) includes a 20-bit physical page number and attributes, which are re-ordered for placement in the TLB. The dirty or accessed bit for the page may be updated at this time. The segment's attributes must also be fetched from the active segment descriptor cache as described in steps 304, 306 for other fields of the active segment descriptor cache. The segment's attributes are merged into the page attributes by selecting the most-restrictive to the page's and segment's attributes for each type of attribute. The upper 20 bits of the linear address, and the upper 20 bits of the physical address, and attributes are used to construct the TLB entry. These fields may be written separately to the TLB, or preferably they are first assembled and grouped together in memory before being written to the TLB.

The partial page control bits are also set to "00", indicating that the whole page is valid and disabling bounds checking on subsequent accesses to this TLB entry. The segment number is also loaded into the TLB entry, or the segment's enable bit in the six-bit segment number field is enabled, step 330. Finally the fully-assembled TLB entry is loaded into the TLB, step 332, if it was not loaded piecemeal-fashion.

At this point the faulting user program may be resumed, allowing the faulting instruction to be re-executed, and the linear address in the DAR register re-generated to be translated by the newly-loaded entry in the TLB.

Partial Page Valid—FIG. 12B

FIG. 12B shows TLB loading when only a part of the page is valid. Many of the same steps are used by partial-page loading subroutine 340 as shown and described for FIG. 12A.

The partial page control bits are set to a value other than "00", indicating that only a partial page is valid, step 344. Table 2 shows encoding for these partial-page control bits.

The offset bounds fields 82, 84 of FIG. 9 are loaded in step 342 with the 12-bit FLA and/or LLA values retrieved from the active segment descriptor cache. It may be necessary to read FLA and LLA from memory again (as shown in steps 304, 312) if they are not still stored in temporary GPR's on the CPU. If the page contains an upper bound, as indicated by LCP compare step 310 failing, the LLA must be loading into page offset bounds field 84, and the partial page control bits are set to "01". If the page contains a lower bound, as indicated by FCP compare step 308 failing, the FLA must be loading into page offset bounds field 82, and the partial page control bits are set to "10". If both LCP and FCP compare steps 308, 310 were to fail, then both the upper and the lower bound lie within the page. Page offset field 82 is loaded with the FLA and page offset field 84 is loaded with the LLA, and the partial page control bits are set to "11", enabling both upper and lower bounds checking on subsequent TLB accesses.

Other steps are similar to those shown and described for FIG. 12A.

ROUTINE TO INVALIDATE OLD SEGMENT'S TLB ENTRIES—FIG. 13

Figure 13:
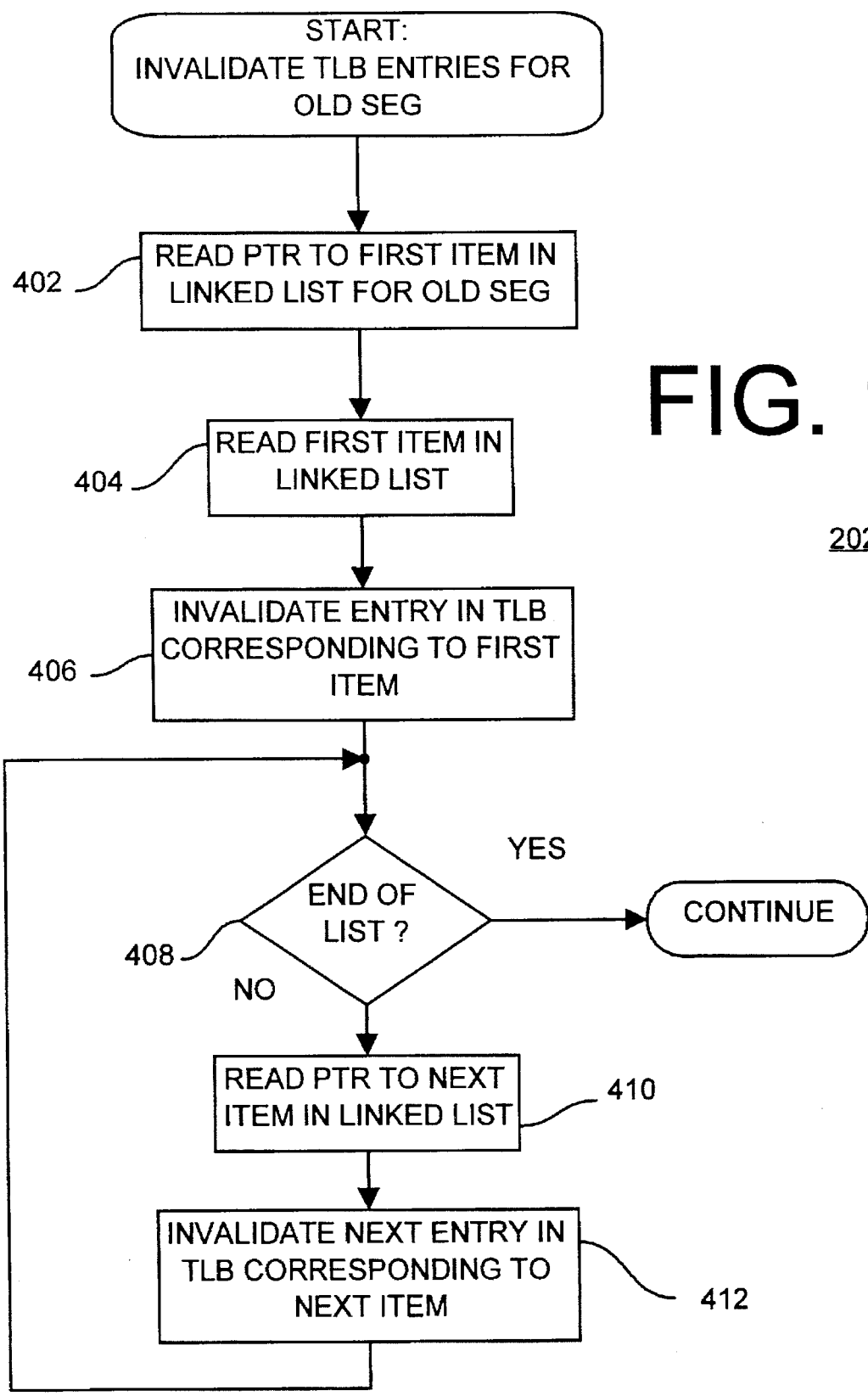
FIG. 13 is an emulation subroutine 202 to invalidate TLB entries for an old segment being unloaded.

FIG. 13 is an emulation subroutine 202 to invalidate TLB entries for an old segment being unloaded. This subroutine 202 is called from the segment load routine 200 of FIG. 11A. Six linked lists are set up in emulation subroutine 202's memory, one for each active segment. A linked list is a series of entries, with each entry having a data item and a pointer. The pointer points to the address of the next entry in the linked list. Thus the items are "linked" together by their pointers. When a linked list is used, an entry is added to the linked list for a segment each time a new translation is loaded into the TLB for that segment (this is done during step 332 of FIGS. 12A, 12B). Typically the new entry is added to the end of the linked list and the pointer to the new entry is added to the formerly-last entry. An entry is deleted from the linked list each time a segment's translation is removed from the TLB, as when a TLB entry is replaced. The TLB miss routine must include a search routine to locate the linked list for each segment enabled for that TLB entry, and then locate the entry in the linked list for that translation and deleted the entry. The pointer of the previous entry in the linked list is replaced with the deleted entry's pointer.

The invalidation subroutine 202 reads the segment number and reads the pointer to the first item in that segment's linked list, step 402. This pointer may be stored in the active segment descriptor cache in field "x" of FIG. 6. The first item in the linked list is read at the memory location pointed to by the pointer, step 404. That item includes a pointer to an entry in the TLB for that segment. The TLB entry pointed to by the first item is invalidated for that segment by clearing its segment enable bit in the segment number field of the TLB entry, step 406. A check is made to determine if the end of the linked list has been reached, 408. If not, the first item's pointer is read, and the second item is retrieved, 410. The TLB entry corresponding to the second item is then invalidated, 412. This process is repeated until the end of the linked list is reached, and all TLB entries for that linked list's segment are invalidated.

An alternate embodiment of the linked list is to include an additional first-link bit in field X. The first-link bit is set when the first page for a segment is loaded into the TLB. Thus old segments with no active TLB entries can be swapped out without consulting the linked list. However, once the first entry is loaded into the TLB for a segment, then the first-link bit is set in its active segment descriptor cache entry, and purging this old segment would require consulting the linked list as described.

Another alternative is to have a gang-clear function in the TLB hardware. The gang-clear would be asserted by writing a command to the TLB, identifying the segment number. All TLB entries would have this segment's valid bit cleared by this gang-clear. While this rapidly clears the TLB of the old segment, it requires additional hardware in the TLB, such as an AND gate for each segment valid bit in each TLB entry or location.

A brute force approach is to read each entry in the TLB and compare its segment valid bits to the current segment, or to write back these segment valid bits with the old segment's valid bit cleared. Reading and writing each TLB entry can require many separate clock cycles though.

SOFTWARE HANDLER ROUTINE

Figure 14:
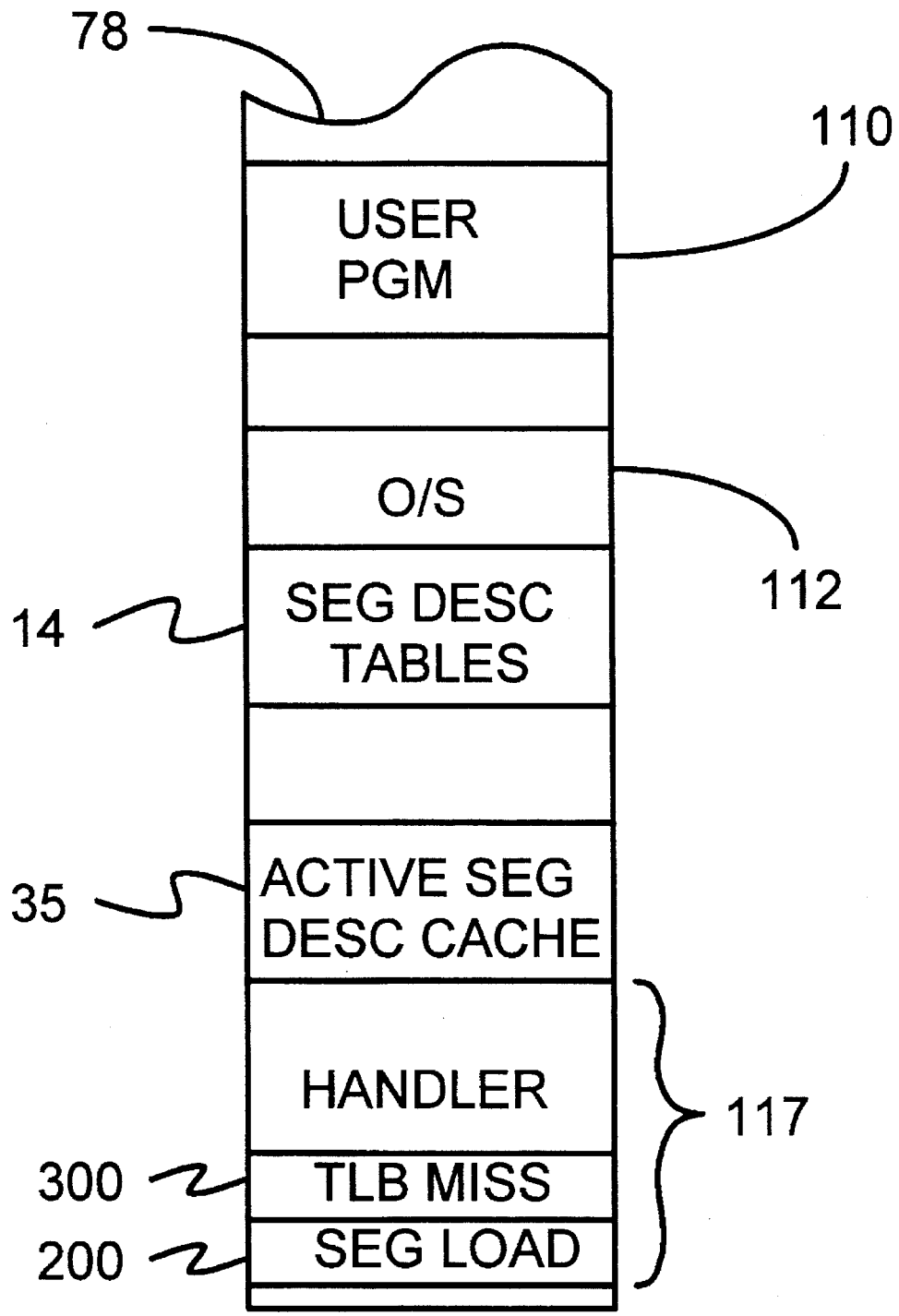
FIG. 14 is a diagram of a physical memory space which contains a user program, an operating system, and emulation handler routines.

FIG. 14 is a diagram of a physical memory space 78 which contains a user program 110, an operating system 112, and emulation handler routines 117. Emulation handler routines 117 include several routines activated for different reasons. These routines include TLB miss routine 300 and segment load routine 200, detailed in FIGS. 11, 12. Segment descriptor tables 14 resides near operating system 112, while active segment descriptor cache 35 resides near emulation handler routines 117.

ALTERNATE EMBODIMENTS

Several other embodiments are contemplated by the inventors. Various combinations of the embodiments described and trade-offs among them are possible. Instead of designating sub-pages down to byte-granularity, sub-pages could be defined only down to an intermediate granularity, with software checking the remaining references.

A page size of 4096 bytes was described with reference to the embodiments, but other page sizes and address sizes may be easily substituted by one skilled in the art. Standard expand-up segments were described, but expand-down segments may also be used. Expand-down segments are commonly used for stacks while expand-up segments are used for code and data segments. These segment types are well-known in the art. Many other combinations of the embodiments disclosed are possible in light of the teachings herein.

FIG. 7 described a separate segment adder that added the segment base address to the effective address in the memory management unit (MMU). A more preferred embodiment is disclosed in the parent patent that performs this addition in the ALU rather than in the MMU. The two-port adder in the ALU is expanded to three ports to allow the segment base to be added in when the effective address is being generated. This blurs the distinction between the ALU and the MMU, but generates the linear address in fewer steps.

While an embodiment with only two page offset bounds fields 82, 84 (FIG. 9) has been explained, it would be obvious for one skilled in the art to employ a different number of offset bounds fields or a different number of encoding control bits 86, 88. For example, the encoding may be changed for greater than or equal to a page offset bound value, and still fall within the spirit of the invention. Additional control bits may also be added. A "100" encoding could specify that the entire page is valid except the region between the two offset bounds 82, 84. This is useful for watchpoints and disabling faulty memory locations. Any reference between the two bounds 82, 84 would cause a page fault.

Another embodiment is to not load any partial pages in the TLB. Only clear pages are loaded into the TLB. All references to partial pages at segment boundaries will cause a TLB miss. The TLB miss handler operates as described, except that partial pages are not loaded into the TLB. At the point that the new partial page would otherwise be loaded into the TLB, the TLB miss handler must emulate the memory reference causing the page fault, or load a special one-time TLB entry that will be valid for only one reference, after which it will become invalid. The one-time TLB entry is described in the parent patent. The segment load and TLB miss emulation routines described herein may be applied to these other embodiments described at length in the parent patent.

Debug or program watchpoint emulation may be combined with the invention by designating these watchpoints as invalid offsets within a page. Additional bounds fields and compare logic may be needed to efficiently handle both segment bounds and watchpoints on a single page. The emulation routines described herein may be modified to program in additional bounds fields or modify existing segment bounds fields during the debug processing step.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A system for emulating segmentation on a processor with page-address translation, the system comprising:

a central processing unit (CPU) comprising:

a segment register for storing a base address of an active segment, the active segment being accessed by a user program executing on the CPU, the segment register not storing a limit for the active segment;

linear address generation means, receiving an identifier for the active segment from the user program, for selecting the segment register containing the active segment and adding the base address of the active segment to an address from the user program, the linear address generation means outputting a sum as a linear address;

a translation-lookaside buffer (TLB), receiving the linear address from the linear address generation means, the TLB comprising a plurality of page translation entries for pages in memory having a fixed number of offset addresses, each page translation entry comprising a linear address field and a physical address field, the TLB outputting the physical address field for a matching entry when a portion of the linear address matches the linear address field in the matching entry;

a memory having a plurality of storage locations addressable by a plurality of physical addresses, the memory having:

a first portion for storing a segment descriptor table comprising a plurality of segment descriptors, each segment descriptor having attributes, a base address, and a limit for a segment; and a second portion for storing an active segment descriptor cache, the active segment descriptor cache comprising a plurality of entries for active segments loaded in the CPU for access, the identifier for the active segment selecting a selected cache entry for the active segment, each entry comprising:

a copy from the segment descriptor table of the attributes of one of the active segments;

a first clear page field indicating the address of a first clear page in the active segment, the first clear page having all offset addresses within the page being valid for access;

a first linear address field indicating a first linear address for the active segment;

wherein the segment's limit is not stored on the CPU but is only stored in the memory.

2. The system of claim 1 further comprising:

emulation handler means, for execution on the CPU, for checking for segment bounds violations of linear addresses for pages not having all offset addresses within the page valid, wherein segment bounds are checked only for pages not having all offset addresses within the page valid, wherein clear pages with all offset addresses valid are not checked for segment bounds violations.

3. The system of claim 1 further comprising:

a bound field in the matching entry in the TLB, the bound field containing a bound for the active segment;

segment bounds checking means, receiving the bound from the matching entry of the TLB, for comparing a portion of the linear address to the bound, signaling a segment bound violation if the linear address is outside the bound for the active segment.

4. The system of claim 3 wherein the segment bounds checking means is disabled when the matching entry contains a clear page with all offsets within the page valid for access by the active segment, wherein segment bounds are checked only for pages not having all offset addresses within the page valid, wherein clear pages with all offset addresses valid are not checked for segment bounds violations.

5. The system of claim 1 wherein each entry in the active segment descriptor cache further comprises a copy from the segment descriptor table of the base address and the limit of one of the active segments.

6. The system of claim 1 wherein each entry in the active segment descriptor cache further comprises a selector for the active segment, the selector containing an index into the segment descriptor table.

7. The system of claim 1 wherein each entry in the active segment descriptor cache further comprises:

a last clear page field indicating the address of a last clear page in the active segment, the last clear page having all offset addresses within the page valid for access; and a last linear address field indicating a last linear address for the active segment.

8. The system of claim 7 further comprising:

a bound field in the matching entry in the TLB, the bound field containing a bound, the bound being an upper bound or a lower bound for the active segment;

segment bounds checking means, receiving the bound from the matching entry of the TLB, for comparing a portion of the linear address to the bound, signaling a segment bound violation if the linear address is outside the bound for the active segment;

wherein the segment bounds checking means is disabled when the matching entry contains a clear page with all offsets within the page valid for access by the active segment, the clear page being the first clear page, the last clear page, or a page between the first clear page and the last clear page, wherein segment bounds are checked only for pages not having all offset addresses within the page valid, whereas clear pages with all offset addresses valid are not checked for segment bounds violations.

9. The system of claim 8 further comprising a TLB miss routine, the TLB miss routine comprising:

means for activation of the TLB miss routine when no matching entry is found in the TLB having a linear address field matching a portion of the linear address;

means for retrieving a page table entry from a third portion of the memory;

means for loading the page table entry into the TLB;

means for reading the identifier for the active segment;

means for selecting the selected cache entry for the active segment in response to the identifier for the active segment;

means for reading the first clear page field and the last clear page field from the selected cache entry;

means for comparing a page number portion of the linear address to the first clear page field and the last clear page field, including means for indicating that the linear address is in a clear page when the means for comparing indicates that the linear address is in the first clear page, the last clear page, or a page between the first clear page and the last clear page;

means for writing a disable bit to the page table entry in the TLB, wherein the disable bit disables the segment bounds checking means when the page table entry is in the matching entry;

second compare means for comparing the linear address to the first linear address field and the last linear address field, and for signaling a segment bounds error when the linear address exceeds the last linear address or is less than the first linear address;

means for filling the bound field with the first linear address field when the means for comparing indicates that the linear address is below the first clear page, the means for filling the bound field loading the last linear address field into the bound field when the means for comparing indicates that the linear address is above the last clear page, the means for filling being disabled when the segment bounds error is signaled;

wherein the TLB miss routine compares the linear address to the first clear page field and the last clear page field to determine if the linear address is in a clear page, and loads the disable bit into the TLB when the linear address is to a clear page.

10. The system of claim 1 wherein the linear address generation means comprises a three-port adder, the three-port adder having at least three input ports which receive the base address and effective address components of an address from the user program.

11. The system of claim 1 wherein the segment register for storing a base address of an active segment is a general-purpose register (GPR).

12. A method for emulating a segment load by a CPU, the method comprising:

generating a pointer to a segment table entry in a segment table in a memory;

copying a portion of the segment table entry to an active segment descriptor cache in the memory;

copying a base address from the segment table entry to a segment register on the CPU;

generating a first clear page (FCP) number identifying a first clear page for an active segment, the first clear page being a first page in the active segment with all offset addresses within the page valid for access by the active segment, the first clear page number being
 (i) an upper portion of the base address when a lower portion of the base address is a first offset address on a page,
 (ii) an upper portion of the base address incremented by one page number when a lower portion of the base address is not a first offset address on the page, generating a first linear address (FLA) offset as the lower portion of the base address;

storing the first clear page number (FCP) and the first linear address offset (FLA) in the active segment descriptor cache in the memory;

wherein the active segment descriptor cache is loaded with the portion of the segment table entry but the CPU is loaded only with the base address when the segment is loaded.

13. The method of claim 12 further comprising:

adding the base address to a segment limit, the base address and the segment limit being stored in the segment table entry for the active segment;

outputting the sum of the base address and the segment limit as an upper bound for the active segment;

generating a last clear page (LCP) number identifying a last clear page for the active segment, the last clear page being the last page in the active segment with all offset addresses within the page valid for access by the active segment, the last clear page number being
 (i) an upper portion of the upper bound when a lower portion of the upper bound is a last offset address on a page,
 (ii) an upper portion of the upper bound decremented by one page number when a lower portion of the upper bound is not a last offset address on the page, generating a last linear address (LLA) offset as the lower portion of the upper bound;

storing the last clear page number (LCP) and the last linear address offset (LLA) in the active segment descriptor cache in the memory;

wherein the active segment descriptor cache is loaded with a portion of the segment table entry and the FCP, LCP, FLA, and LLA.

14. The method of claim 13 wherein the upper portion of the base address is a page number and wherein the lower portion of the base address is an offset address on a page.

15. The method of claim 14 wherein the method is activated by a segment load instruction executed by a user program.

16. The method of claim 11 further comprising the step of:

clearing segment valid bits in a translation-lookaside buffer (TLB) for an old segment being replaced by the segment load, the old segment having a same segment number as the active segment.

17. The method of claim 16 wherein clearing the segment valid bits comprises:

asserting a gang clear, the gang clear clearing all segment valid bits in the TLB for the old segment.

18. The method of claim 16 wherein clearing the segment valid bits comprises:

searching the TLB for old entries having the segment valid bit set for the old segment, and clearing the segment valid bit set for the old segment for the old entries.

19. The method of claim 16 wherein clearing the segment valid bits comprises:

searching a linked list in memory for TLB entries having the segment valid bit set for the old segment, and clearing the segment valid bit set for the old segment for the old entries.

20. A method for loading a translation-lookaside buffer (TLB) on a central processing unit (CPU), the method comprising:

deriving a pointer to an entry in an active segment descriptor cache in a memory;

reading a first clear page number and a last clear page number from the entry;

comparing a page number portion of a linear address to the first clear page number;

comparing the page number portion of the linear address to the last clear page number;

loading the TLB with a clear page translation entry having all offset addresses valid for access by a segment when the page number portion is
 (a) not less than the first clear page number, and
 (b) not greater than the last clear page number;

when the clear page translation entry is not loaded:
 reading a first linear address offset and a last linear address offset from the entry;
 decrementing the first clear page number if the first linear address offset is zero and concatenating with the first linear address offset to produce a first linear address;
 incrementing the last clear page number if the last linear address offset is a last offset on a page and concatenating with the last linear address offset to produce a last linear address;
 comparing the linear address to the first linear address;
 comparing the linear address to the last linear address;
 signaling a segment bounds violation when the linear address is less than the first linear address or greater than the last linear address;
 loading the TLB with a partial page translation entry having not all offset addresses valid for access by the segment when a segment bounds violation is not signaled;

whereby the first and last clear page numbers in the active segment descriptor cache are compared to the linear address and a fully-valid page translation is loaded into the TLB when a clear page is found.

* * * * *